United States Patent [19]
Erdem et al.

[11] Patent Number: 5,982,909
[45] Date of Patent: *Nov. 9, 1999

[54] METHOD FOR REGION TRACKING IN AN IMAGE SEQUENCE USING A TWO-DIMENSIONAL MESH

[75] Inventors: A. Tanju Erdem; Candemir Toklu, both of Rochester, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/636,622

[22] Filed: Apr. 23, 1996

[51] Int. Cl.$^6$ .............................. G06K 9/36; G06T 7/20
[52] U.S. Cl. ...................... 382/103; 382/107; 382/241; 348/169; 348/699
[58] Field of Search ..................................... 382/103, 241, 382/236, 238, 107; 348/169, 699, 416

[56] References Cited

U.S. PATENT DOCUMENTS

| | | | |
|---|---|---|---|
| 5,280,530 | 1/1994 | Trew et al. | 382/103 |
| 5,295,201 | 3/1994 | Yokohama | 382/236 |
| 5,581,308 | 12/1996 | Lee | 348/699 |
| 5,592,228 | 1/1997 | Dachiku et al. | 348/699 |
| 5,611,000 | 3/1997 | Szeliski et al. | 382/294 |
| 5,617,482 | 4/1997 | Brusewitz | 382/107 |
| 5,646,691 | 7/1997 | Yokoyama | 382/107 |
| 5,654,771 | 8/1997 | Tekalp et al. | 348/699 |
| 5,668,608 | 9/1997 | Lee | 348/699 |

OTHER PUBLICATIONS

M. Kass, A. Witkin and D. Terzopoulos, "Snakes: Active Contour Models", International Journal of Computer Vision, vol. 1, No. 4, pp. 321–331, 1988.

F. Leymarie and M. Levine, "Tracking Deformable Objects in The Plane Using An Active Contour Model", IEEE Transactions Pattern Analysis and Machine Intelligence, vol. 15, pp. 617–634, Jun. 1993.

K. Fujimura, N. Yokoya, and K. Yamamoto, "Motion Tracking of Deformable Objects by Active Contour Models Using Multiscale Dynamic Programming", Journal of Visual Communication and Image Representation, vol. 4, pp. 382–391, Dec. 1993.

B. Bascle, et al, "Tracking Complex Primitives in An Image Sequence", IEEE International Conference Pattern Recognition, pp. 426–431, Oct. 1994, Israel.

F. G. Meyer and P. Bouthemy, "Region–Based Tracking Using Affine Motion Models in Long Image Sequences", CVGIP: Image Understanding, vol. 60, pp. 119–140, Sep. 1994.

J. Nieweglowski, T. Campbell and P. Haavisto, "A Novel Video Coding Scheme Based on Temporal Prediction Using Digital Image Warping", IEEE Transactions Consumer Electronics, vol. 39, pp. 141–150, Aug. 1993.

Y. Nakaya and H. Harashima, "Motion Compensation Based on Spatial Transformations", IEEE Transactions on Circuits and Systems for Video Technology, vol. 4, pp. 339–356, Jun. 1994.

(List continued on next page.)

*Primary Examiner*—Jon Chang
*Attorney, Agent, or Firm*—Peyton C. Watkins

[57] ABSTRACT

A method for tracking a predetermined, two-dimensional portion of an image throughout a sequence of images, the method comprises the steps of selecting a reference frame; selecting the predetermined, two-dimensional portion within the reference frame by choosing a polygon that defines the boundary of the predetermined portion; fitting a reference mesh having at least three corner nodes and an inside node to the reference polygon; tracking the reference polygon in subsequent or previous image frames by tracking the corner nodes; mapping the reference mesh into the tracked polygon in the subsequent or previous image frames; and refining locations of the inside and corner nodes in the subsequent or previous image frames for tracking local and global motion of the predetermined portion.

13 Claims, 12 Drawing Sheets

OTHER PUBLICATIONS

M. Dudon, O. Avaro and G. Eude, "Object–Oriented Motion Estimation", Picture Coding Symposium, pp. 284–287, Sep. 1994, CA.

C.–L. Huang and C.–Y. Hsu, "A New Motion Compensation Method for Image Sequence Coding Using Hierarchical Grid Interpolation", IEEE Transactions on Circuits and Systems for Video Technology, vol. 4, pp. 42–52, Feb. 1994.

Parvin et al. "Tracking of Tubular Objects for Scientific Applications." Proc. 1994 IEEE Computer Soc. Conf. on Computer Vision and Pat. Rec., Jun. 1994, pp. 295–301.

Wang et al. "Active Mesh—A Feature Seeking and Tracking Image Sequence Representation Scheme." IEEE Trans. on Image Processing, vol. 3, No. 5, Sep. 1994, pp. 610–624.

Fuh et al. "Affine Models for Image Matching and Motion Detection." ICASSP 91, vol. 14, Apr. 1991, pp. 2409–2412.

METHOD FOR REGION TRACKING IN AN IMAGE SEQUENCE USING A TWO-DIMENSIONAL MESH

FIELD OF INVENTION

The present invention is related to the field of digital image processing and analysis and, more specifically, to a technique for tracking a two-dimensional portion of an image, feature of an image, or a particular object for two-dimensional images that are sequentially placed in chronological order for display.

BACKGROUND OF THE INVENTION

In a wide variety of image sequence processing and analysis tasks, there is a great need for an accurate method for tracking the intensity and motion of a portion of an image throughout an image sequence. This portion, called the reference region hereinafter, may correspond to a particular object or a portion of an object in the scene.

Tracking the boundary of an object has been discussed in M. Kass, A. Witkin, and D. Terzopoulos, "Snakes: Active Contour Models", *International Journal of Computer Vision*, volume 1, no. 4, pp. 321–331, 1988; F. Leymarie and M. Levine, "Tracking Deformable Objects in The Plane Using An Active Contour Model", *IEEE Transactions Pattern Analysis and Machine Intelligence*, volume 15, pp. 617–634, June 1993; K. Fujimura, N. Yokoya, and K. Yamamoto, "Motion Tracking of Deformable Objects By Active Contour Models Using Multiscale Dynamic Programming", *Journal of Visual Communication and Image Representation*, vol. 4, pp. 382–391, December 1993; B. Bascle, et al., "Tracking Complex Primitives in An Image Sequence", in *IEEE International Conference Pattern Recognition*, pp. 426–431, October 1994, Israel; F. G. Meyer and P. Bouthemy, "Region-Based Tracking Using Affine Motion Models in Long Image Sequences", *CVGIP: Image Understanding*, volume 60, pp. 119–140, September 1994, all of which are herein incorporated by reference. The methods disclosed therein, however, do not address the tracking of the local deformations within the boundary of the object.

Methods for tracking local deformations of an entire frame using a 2-D mesh structure are disclosed in J. Niewglowski, T. Campbell, and P. Haavisto, "A Novel Video Coding Scheme Based on Temporal Prediction Using Digital Image Warping", *IEEE Transactions Consumer Electronics*, volume 39, pp. 141–150, August 1993; Y. Nakaya and H. Harashima, "Motion Compensation Based on Spatial Transformations", *IEEE Transaction Circuits and System Video Technology*, volume 4, pp. 339–357, June 1994; M. Dudon, O. Avaro, and G. Eud; "Object-Oriented Motion Estimation", in *Picture Coding Symposium*, pp. 284–287, September 1994, CA; C.-L. Huang and C.-Y. Hsu, "A New Motion Compensation Method for Image Sequence Coding Using Hierarchical Grid Interpolation", *IEEE Transactions Circuits and System Video Technology*, volume 4, pp. 42–52, February 1994, all of which are herein incorporated by reference. However, these methods always include the whole frame as the object of interest. They do not address the problem of tracking an individual object boundary within the frame.

U.S. Pat. No. 5,280,530, which is herein incorporated by reference, discusses a method for tracking an object within a frame. This method employs a single spatial transformation (in this case affine transformation) to represent the motion of an object. It forms a template of the object, divides the template into sub-templates, and estimates the individual displacement of each sub-template. The parameters of the affine transformation are found from the displacement information of the sub-templates. Although this method employs local displacement information, it does so only to find a global affine transformation for representing the motion of the entire object. Therefore, while it tracks the global motion of an entire object, it cannot track any deformations that occur within the object (i.e., local deformations).

Although the presently known and utilized methods are satisfactory, they are not without drawbacks. In addition to the above-described drawbacks, they also do not take into account the effects of frame-to-frame illumination changes.

Consequently, a need exists for an improved tracking technique that can track objects within a scene which are undergoing local deformations and illumination changes.

SUMMARY OF INVENTION

The present invention provides an improvement designed to satisfy the aforementioned needs. Particularly, the present invention is directed to a method for tracking a predetermined, two-dimensional portion of an image throughout a sequence of images, the method comprising the steps of (a) selecting a reference frame; (b) selecting the predetermined, two-dimensional portion within the reference frame by choosing a polygon that defines the boundary of the predetermined portion; (c) fitting a reference mesh having at least three corner nodes and an inside node to the reference polygon; (d) tracking the reference polygon in subsequent or previous image frames by tracking the corner nodes; (e) mapping the reference mesh into the tracked polygon in the subsequent or previous image frames; and (f) refining locations of the inside and corner nodes in the subsequent or previous image frames for tracking local and global motion of the predetermined portion.

BRIEF DESCRIPTION OF DRAWINGS

In the course of the following detailed description, reference will be made to the attached drawings in which.

DETAILED DESCRIPTION OF INVENTION

Figure 1:
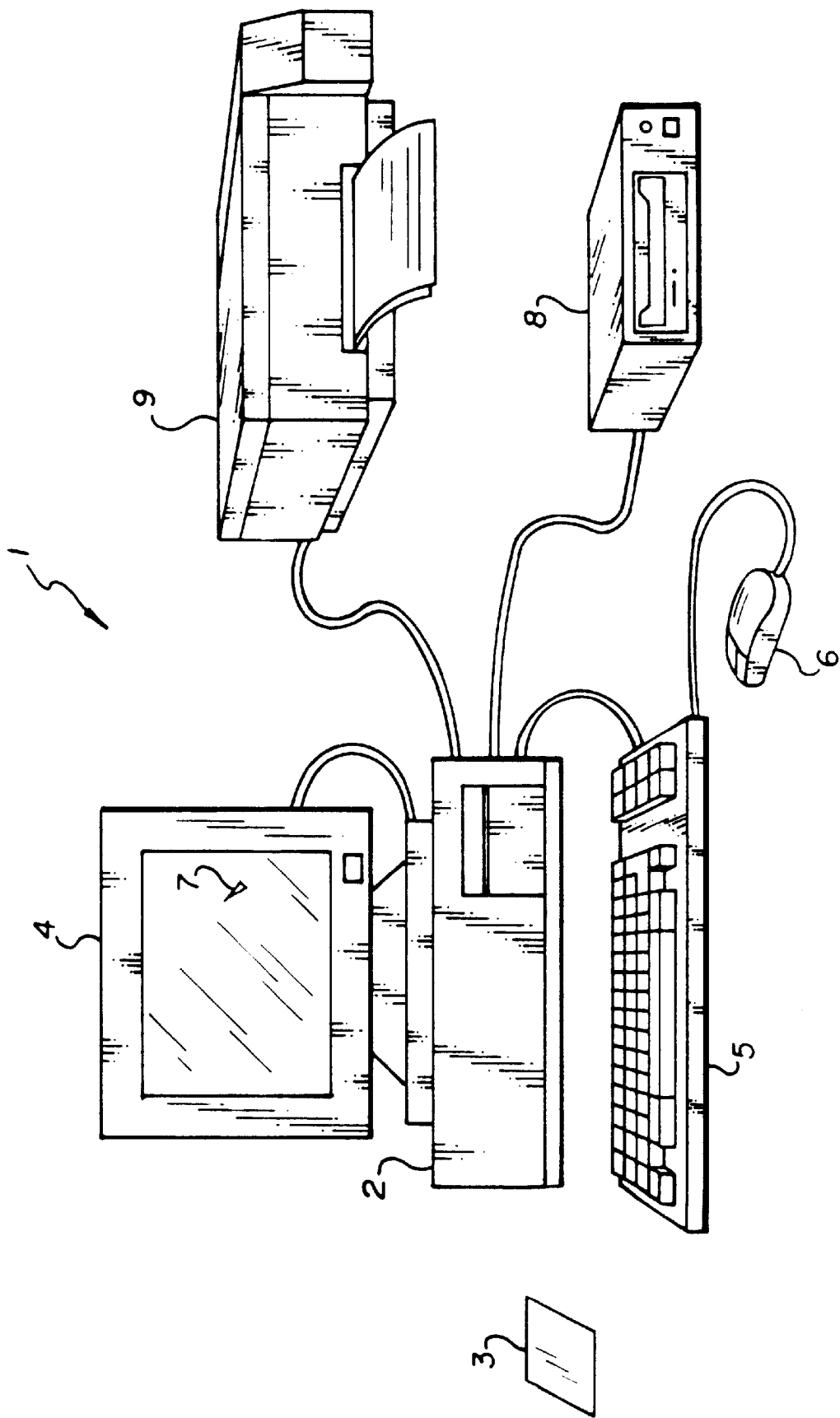
FIG. 1 is a perspective view of a computer system for implementing the present invention.

Referring to FIG. 1, there is illustrated a computer system 1 for implementing the present invention. Although the computer system 1 is shown for the purpose of illustrating a preferred embodiment, the present invention is not limited to the computer system 1 shown, but may be used on any electronic processing system (for example a SPARC-20 workstation). The computer system 1 includes a microprocessor based unit 2 for receiving and processing software programs and for performing other well known processing functions. The software programs are contained on a computer usable medium 3, typically a disk typically, and are inputted into the microprocessor based unit 2 via the disk 3. A display 4 is electronically connected to the microprocessor based unit 2 for displaying user related information associated with the software. A keyboard 5 is also connected to the microprocessor based unit 2 for allowing a user to input information to the software. As an alternative to using the keyboard 5, a mouse 6 may be used for moving an icon 7 on the display 4 and for selecting an item on which the icon 7 overlays, as is well known in the art. A compact disk—read only memory (CD-ROM) 8 is connected to the microprocessor based unit 1 for receiving software programs and for providing a means of inputting the software programs and other information to the microprocessor based unit 1. A compact disk (not shown) typically contains the software program for inputting into the CD-ROM 9. A printer 9 is connected to the microprocessor based unit 2 for printing a hardcopy of the output of the computer system 1.

Figure 2A:
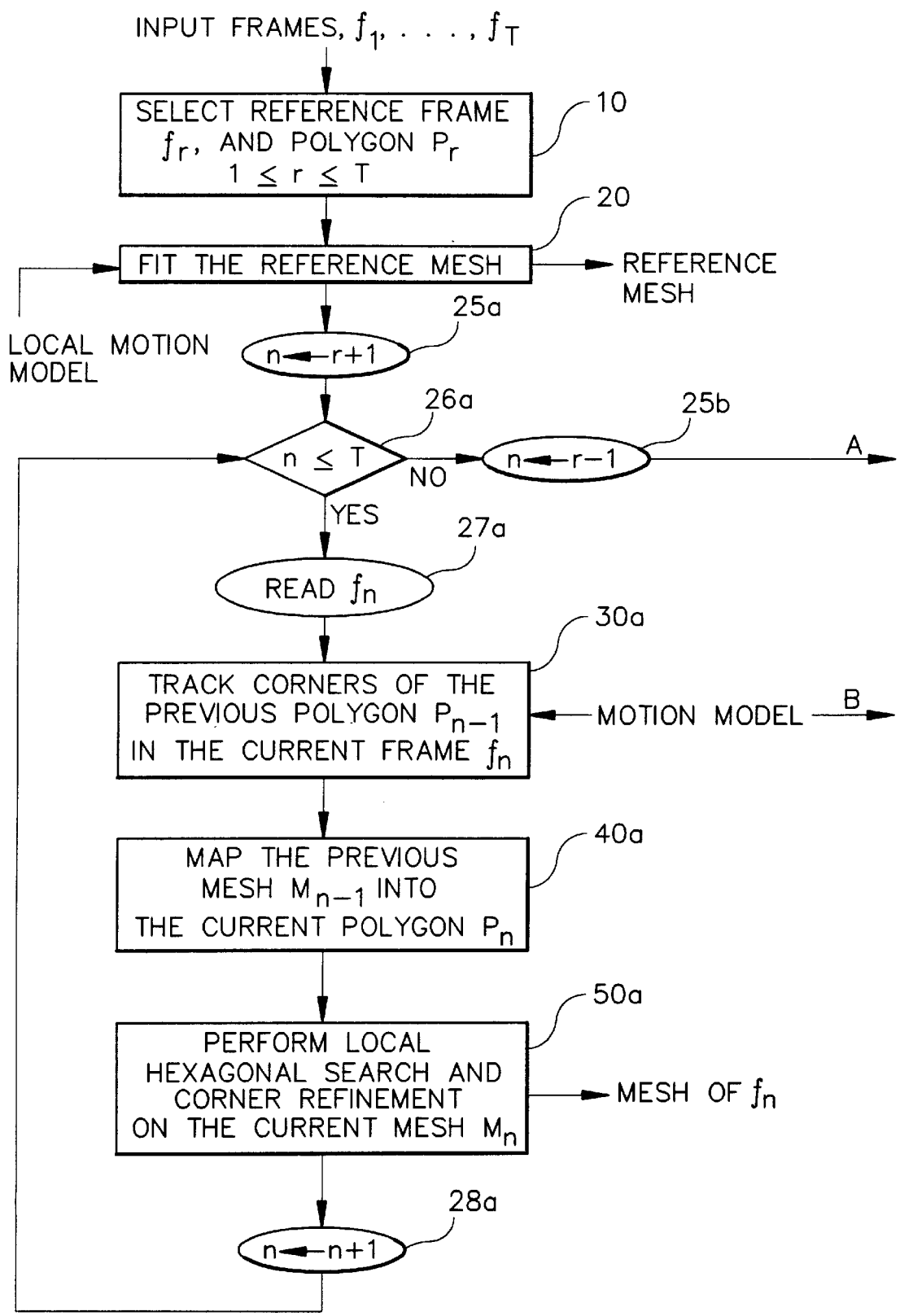
FIGS. 2A and 2B are flowcharts for the method of the present invention.
Figure 2B:
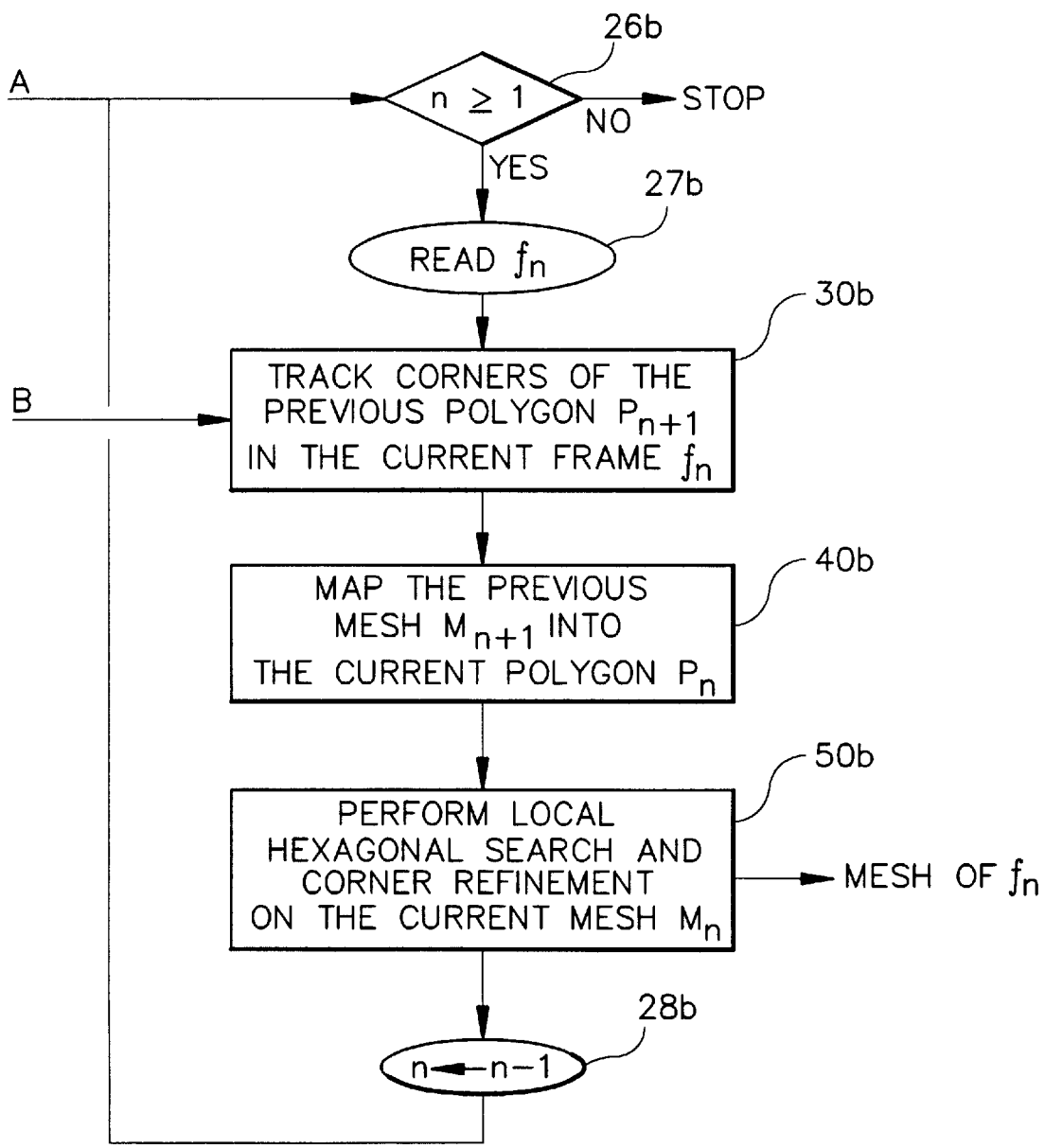

The below-described steps of the present invention are implemented on the computer system 1, and are typically contained on a disk 3 or other well known computer usable medium. Referring to FIGS. 2 and 3, there are illustrated five steps of the present invention which are first succinctly outlined and later described in detail. Briefly stated, these five steps are as follows: (i) selection of a reference frame and a reference polygon 10; (ii) fitting a 2-dimensional mesh inside the reference polygon 20; (iii) tracking the corners of the polygon in the previous frame 30; (iv) mapping the previous mesh onto the polygon in the current frame 40; and (v) local motion estimation via a hexagonal search and corner refinement 50.

A. Selection Of The Reference Frame And Polygon (Step 10)

Figure 3A:
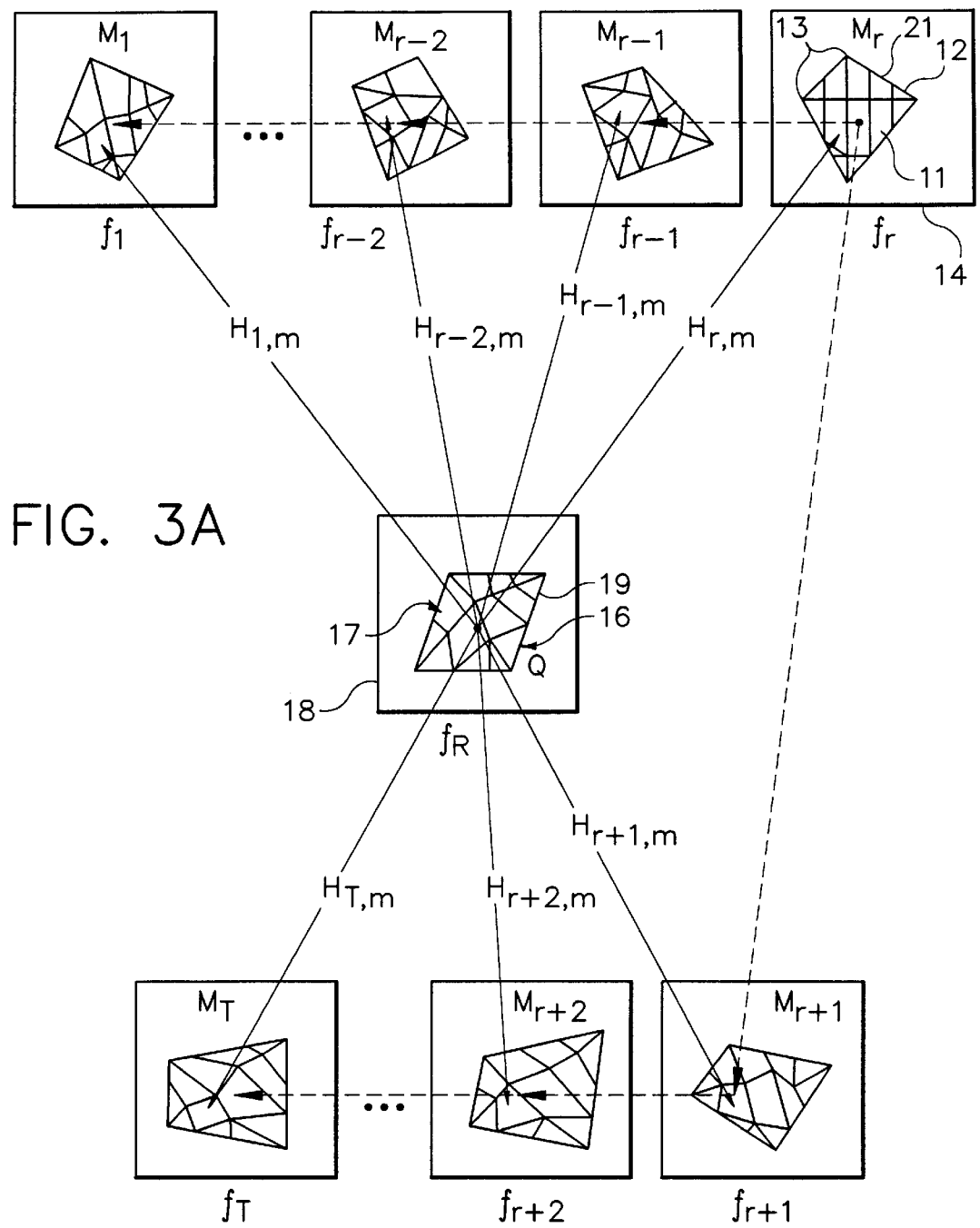
FIGS. 3A and 3B are diagrams illustrating the method of FIGS. 2A and 2B.

Referring to FIGS. 2 and 3(a), in the first step 10, the user selects an object (i.e., the reference object) 11 within any frame ( i.e., the reference frame) 14 that is to be tracked for eventual replacement with another object, which is hereinafter referred to as the replacement object 17. A convex reference polygon 12 is placed over the reference object 11 so that the boundary of the reference polygon 12 coincides with the boundary of the reference object 11. The user creates the reference polygon 12 by selecting corners 13 of the reference polygon 12 for defining its boundary. It is advantageous to model the boundary of the reference object 11 as a polygon for two reasons. First, the polygon can be of any size, and secondly, by tracking only corners, it can be determined how the boundary of the reference object 11 has moved from one frame to another frame.

It is instructive at this point to clarify some of the notation used herein, which is as follows. $T$ denotes the total number of frames in the image sequence in which the reference object 11 is to be tracked. For convenience, the user renumbers these frames, typically starting with 1, in which the reference object 11 is to be tracked. In this regard, $f_n$ denotes the renumbered frames, $P_n$ denotes the polygon in fn, and Mn denotes the mesh in fn, where $1 \leq n \leq T$. Furthermore, r denotes the sequence number of the reference frame 14, and $f_r$, $P_r$, and $M_r$ respectively denote the reference frame 14, the reference polygon 12, and the reference mesh 21. Finally, $L$ denotes the number of corners of $P_r$.

The time order of processing is arbitrary and does not affect the performance of the method. Preferably, the forward time direction is first chosen so that the reference object 11 is first tracked in frames with sequence numbers (r+1), (r+2) . . . , $T$ and then in frames with sequence numbers (r−1),(r−2) . . . , 1.

B. Fitting a 2-D Mesh Into The Reference Polygon (Step 20)

Figure 3B:
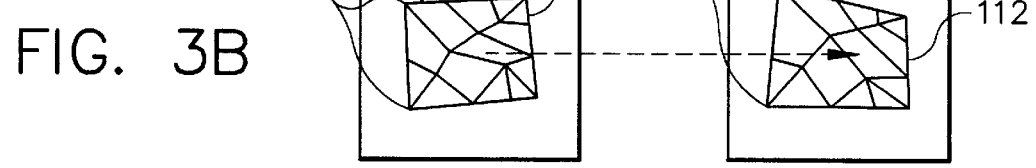
Figure 4:
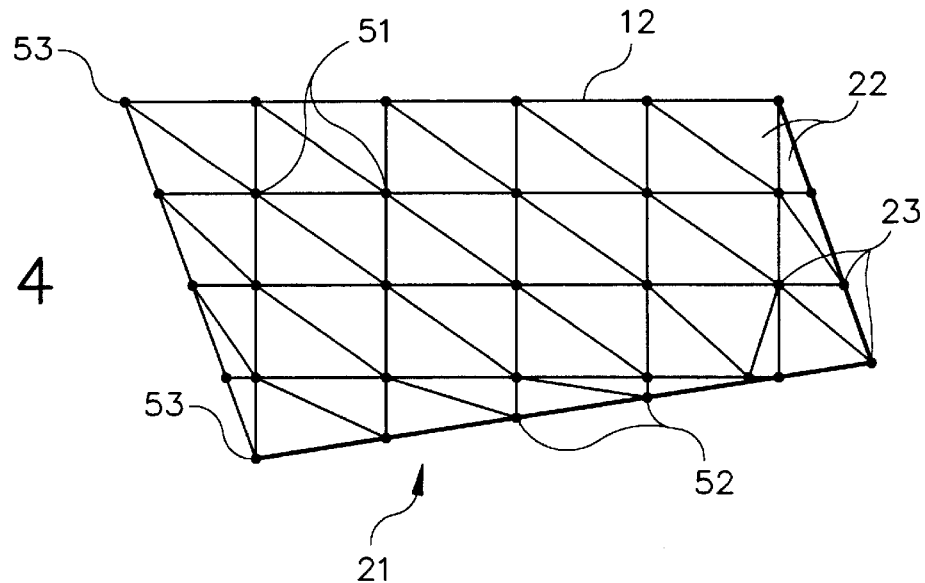
FIG. 4 is an exploded view of a portion of FIG. 3.

Referring to FIGS. 2, 3 and 4, the next step 20 involves fitting a mesh 21 to the reference polygon 12, called the reference mesh 21 that is subsequently tracked. It is the subdivisions of the mesh 21 that allows for tracking regions that exhibit locally varying motion, such as those corresponding to objects within a particular scene having either curved or deforming surfaces or both in combination. The subdivisions, or patches 22, of the reference mesh 21 are defined by the locations of the nodes 23 of the reference mesh 21. For example, FIG. 4 shows a depiction of a triangular mesh 21 fit into a quadrilateral reference polygon 12.

To create the reference mesh 21, the reference polygon 12 is first placed on a regular rectangular grid. The dimensions of each rectangle in the regular rectangular grid are specified by the user. The non-rectangular cells (e.g., trapezoids, pentagons, etc.) that are formed along the boundary of the reference polygon 12 are divided into appropriate number of triangles as shown in FIG. 4. If it is desired that the reference mesh 21 contain only triangular elements, each rectangular cell is further divided into two triangular elements. Thus, the reference mesh 21 consists of patches 22 that are of the same size except for the ones that are around the boundary of the reference polygon 12. It is instructive to note that the nodes 23 are also corners of the patches 22. As may be obvious to those skilled in the art, the mesh 21 is completely described by the collection of its patches 22.

Referring to FIG. 2, once the reference mesh 21 is determined, the frame number n is set to r+1, step 25a, and if $n \leq T$ 26a, frame $f_n$ is read in step 27a. Once the reference mesh 21 is tracked in frame $f_n$ using the Steps 30a, 40a, and 50a, the frame number n is incremented by 1 in 28a and the incremented value is compared with T in step 26a. The Steps 26a, 27a, 30a, 40a, 50a, and 28a, are repeated until n>T. When n>T, the frame number n is set to r−1 in 25b and compared with 1 in step 26b. If $n \geq 1$, frame $f_n$ is read in step 27b. Then, the reference mesh 21 is tracked in frame $f_n$ using the Steps 30b, 40b, and 50b, and the frame number n is decreased by 1 in step 28b. Steps 26b, 27b, 30b, 40b, and 50b, 28b are repeated until n<1.

Referring to FIGS. 2 and 3(b), hereinafter, $f_n$ is called the current frame 114, $P_n$ is called the current polygon 112, and $M_n$ is called the current mesh 121. The previous frame 214 refers to the frame $f_{n-1}$ if n>r, or to the frame $f_{n+1}$ if n<r. It is instructive to note that for both n=r+1 and n=r−1, the previous frame 214 is in fact the reference frame 14. Furthermore, the tracked reference polygon 12 in the previous frame 214 is called the previous polygon 212, and the tracked reference mesh 21 in the previous frame 214 is called the previous mesh 221.

C. Tracking Corners Of The Polygon (Step 30)

Figure 5:
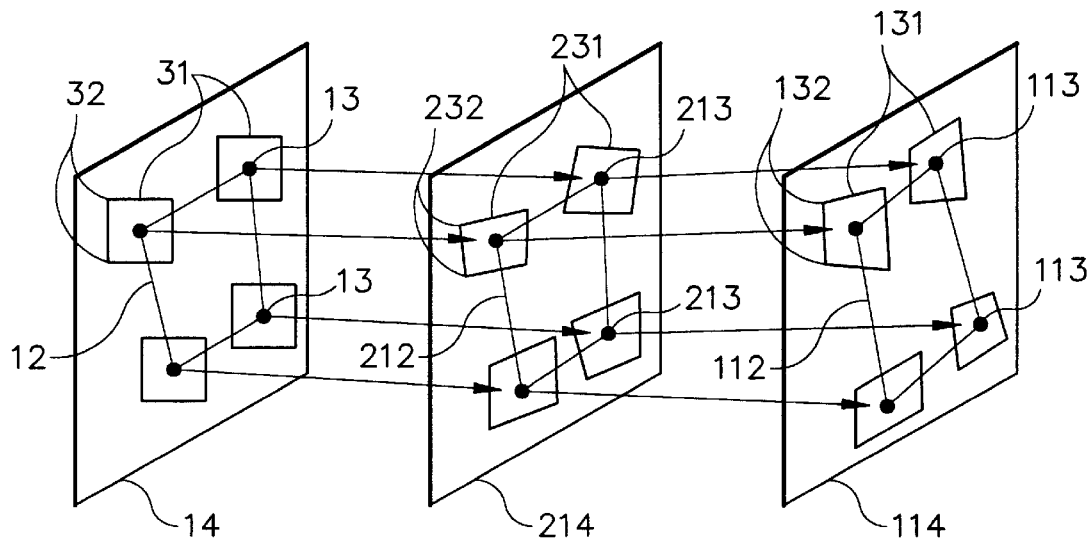
FIG. 5 is a diagram illustrating the corner tracking method of FIGS. 2A and 2B.

The corners 213 of the previous polygon 212 are independently tracked into the current frame $f_n$, 114, as shown in FIG. 5, to find an initial estimate of the current polygon 112. This initial estimate is then refined using the corner refinement process as explained later in this section.

Referring to FIGS. 2, 3, 5, 6, 7, and 8, the corner tracking method includes the following steps: (1) selecting a motion model for the corners 13, (2) assigning a cost polygon 31 to each corner 13 (3) finding the best motion parameters for each cost polygon 231 in the previous frame 214 using a logarithmic search method, and mapping the corners 213 of the previous frame 214 into the current frame $f_n$ 114 with the best motion parameters found for their respective cost polygons 231. In the following, we give a detailed description of these steps.

C1. Selecting A Motion Model For A Corner (Step 30)

Depending on the local motion around the corners 13, one selects for each corner 13 one of the following models: (i) translation, (ii) translation, rotation, and zoom, (iii) affine, (iv) perspective, and (v) bilinear. The translational model is the simplest one, and should be preferably selected if this model is applicable as one well skilled in the art can determine. If the translational model is selected, the user will be required to specify a rectangular search region to indicate the range of translational displacement for the corner 13.

If the local motion around a corner 13 involves either rotation or zoom or both in combination, which is easily determined by one well skilled in the art, we employ the second model, i.e., translation, rotation, and zoom. In this case, in addition to a rectangular search region for the translational part of the motion, the user will be required to specify a second rectangular search region to indicate the range of rotation and zoom.

On the other hand, if there is shear and/or directional scaling of pixels around a corner 13, we employ the third motion model, namely the affine motion model. In order to find the affine motion parameters, the user will need to specify three rectangular search regions: one for the translational part, one for the rotation and zoom part, and one for the shear and directional scaling.

Finally, if perspective or nonlinear deformations are observed in the neighborhood of the corner 13, we employ the fourth or the fifth motion model, respectively. For both the fourth and the fifth models, the user will specify four rectangular search regions-three of them will determine the extent of the affine motion, and the remaining one will determine the amount of perspective or bilinear deformation. As will be explained later, as the complexity of the motion model increases, i.e., as the number of search regions increases, so does the computational requirements for finding the best parameters for the model. Therefore, in order to reduce the computational requirements, it is preferred to use during corner tracking, step 30, as simple a motion model as allowed by the characteristics of the motion around the corner 13.

The size of each search region is defined in integer powers of 2. For each search region, the user specifies two integers, one to indicate the horizontal dimension and one to indicate the vertical dimension of the search region. Thus, if $h$ and $v$ denote the integers specified by the user to respectively indicate the horizontal and vertical dimensions of the search region, then the size of the search region is given by $2^{h+2} \times 2^{v+2}$.

C2. Defining The Cost Polygon For A Corner

Figure 6A:
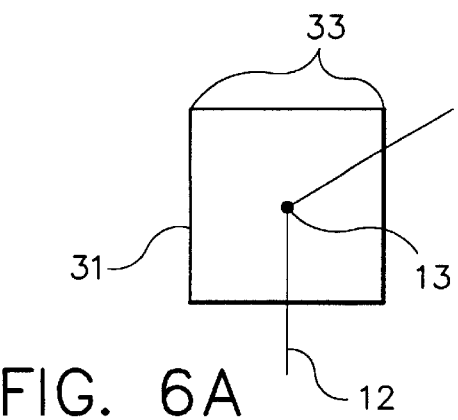
FIGS. 6A, 6B, 7 and 8 are diagrams further illustrating the corner tracking method of FIGS. 2A and 2B.
Figure 6B:
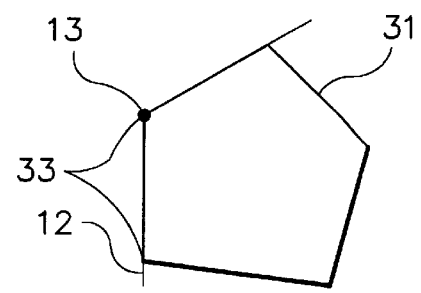

In order to track a corner 213 of the previous polygon 212 into the current frame 114, the user is required to specify a region 31 of pixels around each corner 13 in the reference frame 14 that permits the motion model selected for that corner 13. This region is specified in the form of a polygon, and hereinafter defined as the cost polygon 31. The cost polygon 31 can be defined as a rectangular block centered around the corner 13 as shown in FIG. 6(a), or it can be defined as a polygon having the corner 13 as one of its corners while completely remaining inside the reference polygon 12. In the latter case, one possible choice for the cost polygon 31 is a scaled-down version of the reference polygon 12 placed at the corner 13 as shown in FIG. 6(b). It is instructive to note that the size of the cost polygon 31 should be as large as possible provided that the pixels within the cost polygon 31 permit the same motion parameters.

Figure 7:
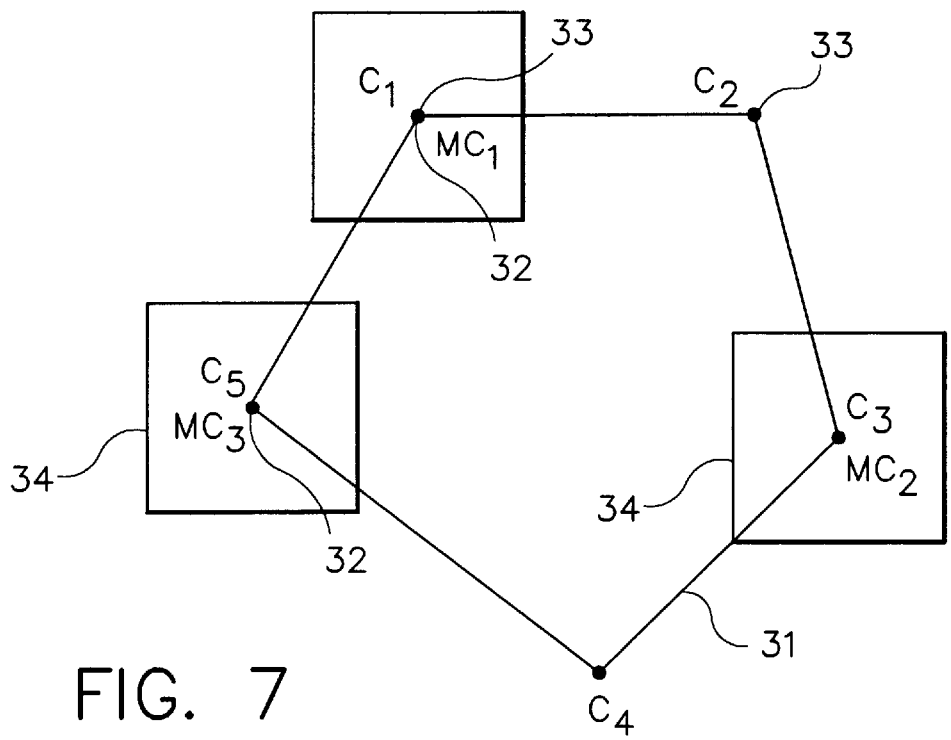
Figure 8:
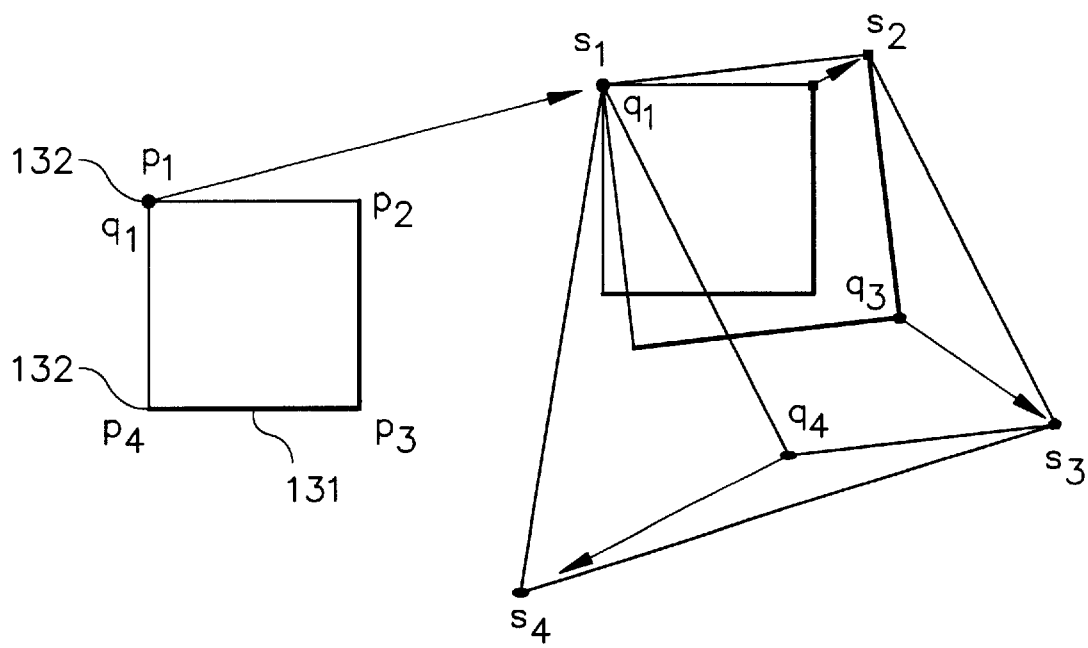

In the following, K denotes the number of search regions specified by the user. As indicated earlier, the number of search regions are determined by the complexity of the motion model. Let C denote the cost polygon 31, and let L denote the total number of its corners 33, e.g., L=4 in FIG. 6(a), and L=5 in FIG. 6(b). Each search region is assigned to a distinct corner 33 of the cost polygon 31. Thus, it is required that K≦L. Referring to FIG. 7, the corners 33 that are assigned a search region are called moving corners (MC) 32. Obviously, if K=L, then all corners 33 will be moving corners 32. The moving corners 32 are numbered from 1 to K in the order of increasing motion complexity (i.e., $MC_1$ introduces translational motion; $MC_2$ introduces rotation and zoom if K≦2; $MC_3$ introduces shear and directional scaling if K ≧3; and $MC_4$ introduces perspective or bilinear deformation if K=4 ). One possible definition for the moving corners 32 is given by $$SC_i = C_{\lfloor iL/K \rfloor} \quad i = 1, 2, \ldots, K. \qquad (1)$$

where $\lfloor x \rfloor$ denotes the largest integer not greater than x, and $C_i$ stands for the corner of C, e.g., as shown in FIG. 7, for L=5 and K=3, we have $MC_1=C_1$, $MC_2=C_3$, and $MC_3=C_5$.

C3. Finding The Best Motion Parameters For A Cost Polygon

Referring to FIGS. 5, 6, 7 and 8, the method for tracking a corner 213 of the previous polygon 212 into the current frame 114 is as follows. The following is repeated for each corner 213 of the previous polygon 212.

Let $R_i$, i=1, . . . , K, denote the locations of the moving corners ($MC_i$, i=1. . . ,K) 32 of the cost polygon 31 in the reference frame 14, and let $P_i$, i=1, . . . ,K, respectively denote the initial locations of the moving corners 132 of the cost polygon 131 in the current frame 114. The initial locations of the moving corners 132 in the current frame are obtained from the locations of the moving corners 232 of the cost polygon 231 in the previous frame 214.

Let D* denote the best mapping for the corner 213, i.e., D* is the mapping that gives the best location of the corner 213 in the current frame 114. In the following, a method is given to determine D*. Let $I_r$ denote the intensity distribution in the reference frame 14, and let $I_C$ denote the intensity distribution in the current frame 114. Let $h_i$, $v_i$, i=1, . . . ,K, denote the integers that respectively determine the size of the search regions 34 for $MC_1$, i–1, . . . , K. The user also specifies the accuracy of the search as an integer power of 2. Let a denote the accuracy of the search.

We are now ready to step-by-step describe the logarithmic search method used for corner tracking. A demonstration of the following is given in FIG. 8.

1. $MC_1$ is moved to 9 different locations in the current frame 114 that are given by $$S_{1;m_1,n_1} = P_1 + \begin{bmatrix} 2^{h_1} m_1 \\ 2^{v_1} n_1 \end{bmatrix}, m_1, n_1 = -1, 0, 1. \quad (2)$$

2. If K=1, we find the translational mappings $$D_{1;m_1,n_1} : r_1 \rightarrow s_{1;m_1,n_1}, \quad m_1, n_1 = -1, 0, 1 \quad (3)$$

and compute the matching error value for each mapping, $$E_{1;m_1,n_1} = \sum_{x \in C} |I_r(x) - I_c(D_{1;m_1,n_1} x)|^2, m_1, n_1 = -1, 0, 1 \quad (4)$$

The best translational mapping is the one for which the matching error value is the smallest, i.e., $$D^* = \min_{m_1, n_1 = -1, 0, 1} \{E_{1;m_1,n_1}\}. \quad (5)$$

We then move to Step 6. If K≥2, however, we let $$q_1 = p_1 \text{ and } t_k = (m_1, n_1, \ldots, m_k, n_k), k=1, \ldots K, \quad (6)$$

for notational simplicity, and continue.

3. We let K=2 and find the following 9 translational mappings $$M_{1;m_1,n_1} : q_1 \rightarrow S_{1;m_1,n_1}, m_1, n_1 = -1, 0, 1 \quad (7)$$

4. We move $MC_k$ to the following $9^k$ locations in the current frame 114.

$$q_{k;t_{k-1}} = M_{k-1;t_{k-1}} P_k, m_1, n_1, \ldots, m_{k-1}, n_{k-1} = 1, 0, 1 \quad (8)$$

For each $q_{k,t_{k-1}}$, we compute the following 9 different locations $$s_{k;t_k} = q_{k;t_{k-1}} + \begin{bmatrix} 2^{h_k} m_k \\ 2^{v_k} n_k \end{bmatrix}, m_k, n_k = -1, 0, 1. \quad (9)$$

If k<K we find the mappings $$M_{k;t_k}:(q_{2;t_1}, \ldots, q_{k;t_{k-1}}) \rightarrow (s_{1;t_1}, s_{2;t_2}, \ldots, s_{k;t_k}), m_1, n_1, \ldots, m_k, n_k = -1, 0, 1. \quad (10)$$

increment k by 1, and repeat Step 4; otherwise, i.e., if k=K, we continue.

5. We find the following $9^k$ mappings $$D_{k;t_k}:(r_1, \ldots, r_k) \rightarrow (s_{1;t_1}, \ldots, s_{k;t_k}), m_1, n_1, \ldots, m_k, n_k = -1, 0, 1 \quad (11)$$

and compute for each one of them the matching error values $$E_{k;t_k} = \sum_{x \in C} |I_r(x) - I_c(D_{k;t_k} x)|^2, m_1, n_1, \ldots, m_k, n_k = -1, 0, 1 \quad (12)$$

The best mapping is the one for which the matching error value is the smallest, i.e., $$D^* = \min_{m_1, n_1, \ldots, m_k, n_k = -1, 0, 1} \{E_{k;t_k}\}. \quad (13)$$

6. We let $t_K^* = (m_1^*, n_1^*, \ldots, m_K^*, n_K^*)$ denote the index values that correspond to D*. We decrement the values of $h_1, v_1, \ldots, h_K, v_K$, by 1. If $h_1, v_1,$ <a for all 1=1, \ldots, K, we have found the best model parameters with the desired accuracy and thus we stop. Otherwise we let $$p_1 = s_{1;t_{kp = sj^*k}^*}$$

and go to Step 1 to implement the next level of the logarithmic search.

Once the best model parameters D* are found, the corner 13 of the reference polygon 12 is mapped to the current frame 114 with D*, and the above procedure is repeated for remaining corners 13 of the reference polygon 12.

A method for finding D* is given in V. Seferidis and M. Ghanbari, "General Approach to Block-Matching Motion Estimation," *Optical Engineering*, volume 32 (7), pp. 1464–1474, July 1993. The presently disclosed method is an improvement over "General Approach to Block Matching and Motion Detection," because (1) the effect of each component of the motion model on the transformations of the cost polygon 31 is controlled by the search region associated with that component of the motion model, and (2) non-convex polygons are less likely to occur during the logarithmic search process due to the cumulative nature of the movements of the corners 32 of the cost polygon 31. Furthermore, the error expressions (Equations 4 and 12) used in the presently disclosed method can be modified according to C.-S. Fuh and P. Maragos, "Affine models for image matching and motion detection," in *IEEE International Conference Acoustic Speech and Signal Processing*, pp. 2409–2412, May 1991, Toronto, Canada, so that illumination changes in the scene are also incorporated during corner tracking, step 30.

D. Mapping The Previous Mesh (Step 40)

Figure 9:
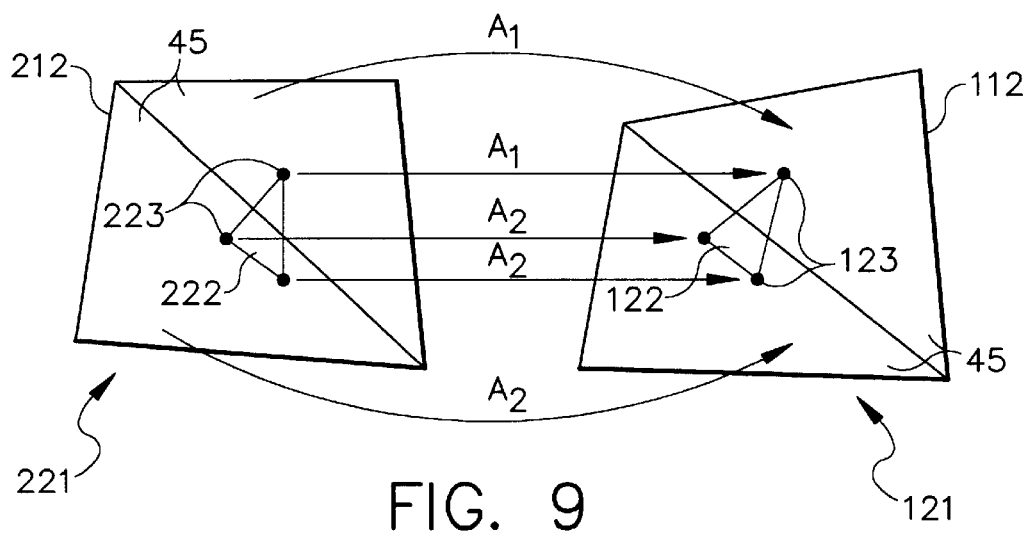
FIG. 9 is a diagram illustrating the method for mapping a reference mesh of FIGS. 2A and 2B.

Referring to FIG. 9, once an initial estimate of the current polygon 112 is determined in step 30, the next step 40 is to map the previous mesh 221 into the current polygon 112 to obtain an initial estimate for the current mesh 121. An initial estimate of the current mesh 121 is obtained by mapping the nodes 223 of the previous mesh 221 into the current polygon 112 using a set of affine transformations as follows.

Let $M_p$ and $M_c$ respectively denote the previous mesh 221 and the current mesh 121, with c and p respectively denoting the numbers of the current 114 and previous 214 frames, such that $$1 < c \neq r < T \text{ and } p = \begin{cases} c - 1, \text{ if } c < r \\ c + 1, \text{ if } c > r \end{cases} \quad (14)$$

where r denotes the reference frame number. Let $P_p$ and $P_c$ respectively denote the previous polygon 212 and the current polygon 112. In order to compute the aforementioned affine transformations, first divide $P_p$ and $P_c$ into (L−2) triangles 45. Then the triangular division can be formulated as follows:

$$R_{i_k} = (P_{i_1} P_{i_{k+1}} P_{i_{k+2}}), \text{ for } k = 1, \ldots, L-2, i = p, c, \quad (15)$$

where $R_{i_k}$ is the $k$th triangle on $P_i$ Divide $P_p$ and $P_c$ as in (15) and find the affine transformations $A_k$: $P_{p_k} \rightarrow P_{c_k}$, k=1, \ldots, L−2. All nodes $g_n$ 223 of $M_p$ for n=1, \ldots, N, where N is the total number of nodes 223, are visited sequentially and mapped into the current polygon 112 as $A_m(g_n)$ if $g_n \in R_{p_m}$. Mapping the corners 223 of a patch 222 in the previous polygon 212 to the corners 123 of a patch in the current polygon 112 is shown in FIG. 9. Based on the properties of affine transformation as explained in G. Wolberg, "Digital image warping, "*IEEE Computer Society Press*, 1992, Los Alamitos, Calif., which is herein incorporated by reference, if a node 23 is on the boundary of two triangles 45, it is mapped to the same location by the affine transformations obtained for both triangles. The current mesh $M_c$ 121 constructed from the previous mesh $M_p$ 221 using the affine transformations as defined above is called the initial current mesh 121 in the current frame 114, and is refined by using the method given in the following section.

E. Hexagonal Search and Corner Refinement (Step 50)

Referring to FIGS. 10 through 18, an efficient search strategy is employed to refine the initial current mesh 121 on the current frame 114. This allows for handling image regions containing locally varying motion, i.e., image regions corresponding to scene objects with curved surfaces or surfaces that undergo mild deformations (i.e, deformations that do not cause self occlusion of parts of the object). The invention also discloses a method to account for possible changes in the illumination in the scene. The detailed description of this method is furnished later in this Section.

Let N and M respectively denote the number of nodes 23 and patches 22 in the reference mesh 21. Also, let $g_i$ and $r_j$ respectively denote the $i$th node 123 and the $j$th patch 122 in the current mesh 121, where i=1, ..., N and j=1, ..., M. Each patch 122 in the current mesh 121 is allowed to go through spatial warpings that are either affine or bilinear by moving the nodes 123 of the mesh 121. Affine and bilinear warpings are discussed in detail in G. Wolberg, "Digital image warping," *IEEE Computer Society Press*, 1992, Los Alamitos, Calif. Affine mapping assumes three point correspondences and has six parameters:

$$\begin{bmatrix} u \\ v \end{bmatrix} = \begin{bmatrix} a_{11} & a_{12} \\ a_{21} & a_{22} \end{bmatrix} \begin{bmatrix} x \\ y \end{bmatrix} + \begin{bmatrix} a_{13} \\ a_{23} \end{bmatrix}, \quad (16)$$

where (x,y) and (u,v) denote the coordinates of a point before and after the affine mapping is applied, respectively. An affine map maps a rectangular block into an arbitrary parallelogram, giving shear, scaling, rotation and translation to it. Bilinear mapping assumes four point correspondences and has eight parameters:

$$\begin{bmatrix} u \\ v \end{bmatrix} = \begin{bmatrix} a_1 & a_2 & a_3 & a_4 \\ b_1 & b_2 & b_3 & b_4 \end{bmatrix} \begin{bmatrix} 1 \\ x \\ y \\ xy \end{bmatrix} \quad (17)$$

Note that affine mapping is obtained from bilinear mapping by setting $a_3=0$ and $b_3=0$ in ( ). For even further details, the book "Digital Image Warping" can be referenced.

Our method uses the affine mapping when the reference mesh 21 includes only triangular patches 22. When the reference mesh 21 includes only rectangular patches 22, our method uses only the bilinear transformation. It is also possible that the reference mesh 21 contains both triangular and rectangular patches 22, in which case our method employs the affine transformation for the triangular patches 22, and the bilinear transformation for the rectangular patches 22.

Due to the ratio preserving properties of the bilinear and affine transformations, the image intensity distribution along the sides of the patches 122 in the current frame 114 always remains continuous as the nodes 123 are moved. In this step, the corners 113 of the current polygon 112 are also refined, as will be described in detail below.

Referring to FIG. 4, three different types of nodes 23 are identified on the reference mesh 21, they are as follows: nodes 51 that are inside the polygon 12 (inside nodes), nodes 52 that are on the boundary of the polygon 12 (boundary nodes), and nodes 53 that are at the corners of the polygons 12 (corner nodes). Once the initial current mesh 121 is obtained, the positions of inside 51, boundary 52, and corner 53 nodes on the current mesh 121 are refined so that the difference in the intensity distribution between the current polygon 112 and its prediction from the reference polygon 12 is minimized. In order to refine the positions of the inside nodes 51, the hexagonal search approach is used as disclosed in Y. Nakaya and H. Harashima, "Motion compensation based on spatial transformations," *IEEE Transactions Circuits and System Video Technology*, vol. 4, pp. 339–357, June 1994. It is an iterative displacement estimation method that evaluates candidate spatial transformations. Using hexagonal search, Y. Nakaya and H. Harashima refine the positions of only the inside nodes 51. The positions of boundary nodes 52 are refined using a block matching approach in J. Niewglowski, T. Campbell, and P. Haavisto, "A Novel Video Coding Scheme Based on Temporal Prediction Using Digital Image Warping," *IEEE Transactions Consumer Electronics*, vol. 39, pp. 141–150, August 1993. The present invention refines the positions of the boundary nodes 52 using a variation of the hexagonal search method. Since boundary nodes 52 that are on the same line must remain on the same line, their motion must be restricted to a line space during the hexagonal search. Thus, for a boundary node 52 the search space is one-dimensional while it is two-dimensional for an inside node 51.

E1. Refining the Locations of the Inside Nodes 51

The position of each inside node 51 in the initial current mesh 121 is refined in an arbitrary order. Referring to FIG. 10, let G be the current inside node 51 whose position is to be refined and let $S_1, S_2, \ldots, S_k$ denote the patches 122 surrounding G 51 on the current mesh $M_c$ 121, where K is the number of patches 122 for G. Let the corresponding patches 22 on $M_r$ 21 be denoted by $S_{r1}, S_{r2}, \ldots, S_{rK}$. The first step of the hexagonal search for node G 51 is to find the region in the current frame 114 that will be affected from the movement of G 51. This region is called the cost polygon 54 and denoted by S, where $$S = \bigcup_{i=1}^{K} S_i.$$

The cost polygon 54 for node G 51 in the current frame 114 can be generated very easily using the following steps:

1. Set i=0 and create an empty point list,
2. Let i←i+1,
3. Construct patch $S_i$, let z=size of $S_i$,
4. Find the corner index, j, of G on patch $S_i$,
5. From k=j+1 to k=j+z−1 append the (k mod z)'th corner of $S_i$ to point list if it is not already in the list.
6. If i<K go to step 2.
7. The points in the list will be clockwise ordered.

Figures 10A, 10B:
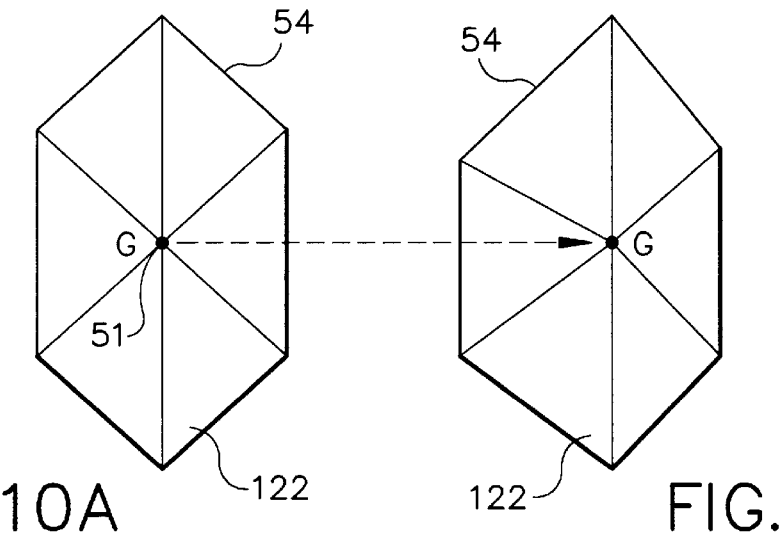
FIGS. 10A, 10B, 11, 12A and 12B are diagrams depicting a method for refining the location of inside nodes of the reference mesh.

If the reference polygon 12 is rectangular, and triangular patches 22 are used, then all cost polygons 54 turn out to be hexagons, as shown in FIG. 10, for inside nodes 51, hence the name "hexagonal search". During the search, node G 51 in FIG. 10(a) is moved to a new location as shown in FIG. 10(b) in a search space, updating the deformations of the triangular patches 122 inside the cost polygon 54. The updated patches 122 in FIG. 10(b) are called S'$_i$'s, (S'$_i$←S$_i$).

The predicted image inside the cost polygon 54 is synthesized by warping undeformed patches 22, $^s$ri's, on the reference frame 14, onto the deformed patches 122, S'$_i$'s, on the current frame. The mean absolute difference (MAD) or mean square difference(MSE), formulated in equation 18, is calculated inside the cost polygon 54.

$$E(x) = \frac{1}{\sum_{k=1}^{K} N_k} \sum_{k=1}^{K} \sum_{(i,j) \in S'_k} |I_c(i,j) - I_r(T_k((i,j)))|^m \quad (18)$$

In Equation 18, (i,j) denotes a pixel location on patch S'$_i$, and MSE or MAD values are calculated by setting m to 1 or 2, respectively. In the same equation $T_i$ denotes the backward spatial transformation, $T_i:S_{r_i}$←S'$_i$, and $N_i$ denotes the total number of pixels inside S'$_i$. The position of G 51 that minimizes the MAD or MSE value is registered as the new location for G 51.

Usually, pixels fall onto non-integer locations after they are mapped using spatial transformations. Intensities for pixels that are on non-integer locations are obtained using bilinear interpolation. In bilinear interpolation, intensity values of the four neighboring pixel locations are employed as explained in the following. Assume that a pixel located at (i,j) on $f_c$ is mapped to (x,y) on $f_r$. If a and b are the largest integers that respectively are not greater than x and y, and if ξ=x−a and π=y−b, then bilinear interpolation is formulated as follows:

$$I_c(i,j) = (1-\xi)(1-\eta)I_r(a,b) + (1-\xi)\eta I_r(a,b+1) + \xi\eta I_r(a+1,b+1) + \xi(1-\eta)I_r(a+1,b) \quad (19)$$

Figure 11:
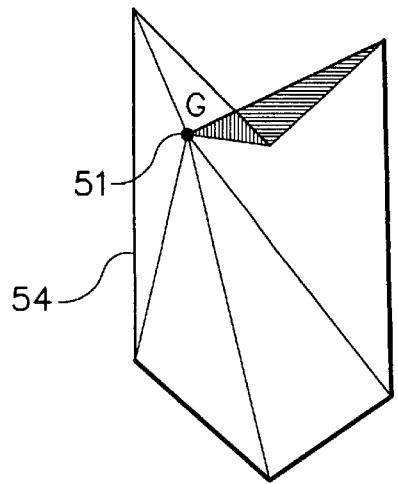
Figure 12A:
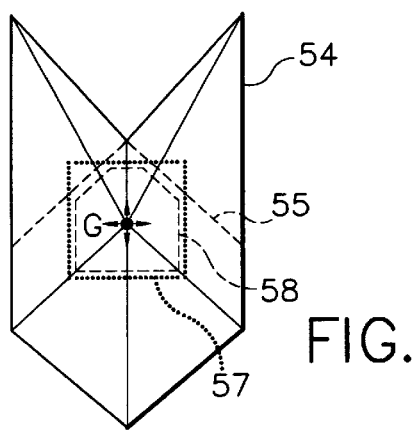
Figure 12B:
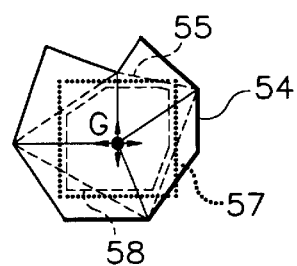

The present invention discloses a method to speed up the original hexagonal search, and referring to FIG. 12, involves finding a search polygon 55 and a search space 57 as explained below. The search polygon for node G 51 in the current frame 114 is found using the following steps:

1. Set i=0 and create an empty point list,
2. Let i←i+1,
3. Construct patch $S_i$, let z=size of $S_i$,
4. Find the corner index, j, of G on patch $S_i$,
5. If z=4, patch is rectangular, append (j+1 mod z)th and (j+3 mod z)th corners of $S_i$ to point list if they are not already in the list.
6. Else if z=3, patch is triangular, append (j+1 mod z)th and (j+2 mod z)th corners of $S_i$ to point list if they are not already in the list.
7. If i<K go to step 2.
8. Order the points in the list in clockwise order.
9. Let F denote the polygon formed by the points found in Step 8. If F is convex, then F is the search polygon 55. If F is not convex, then find the largest convex polygon in F such that G 51 can move within F without causing any overlaps as shown in FIG. 11. We note that this operation is different from finding the convex hull of a polygon (which is well known in the art).

The search space 58 is obtained by introducing a square window 57 around G, whose size is specified by the user. Intersection of the square window 57 with the search polygon 55 gives the search space 58. Examples of search polygon, search window, and search space are shown in FIG. 12 when the patches 122 around G 51 are triangular (a) and when the patches 122 around G 51 are quadrilateral (b). In the following, let A denote the search space 58.

Figure 13:
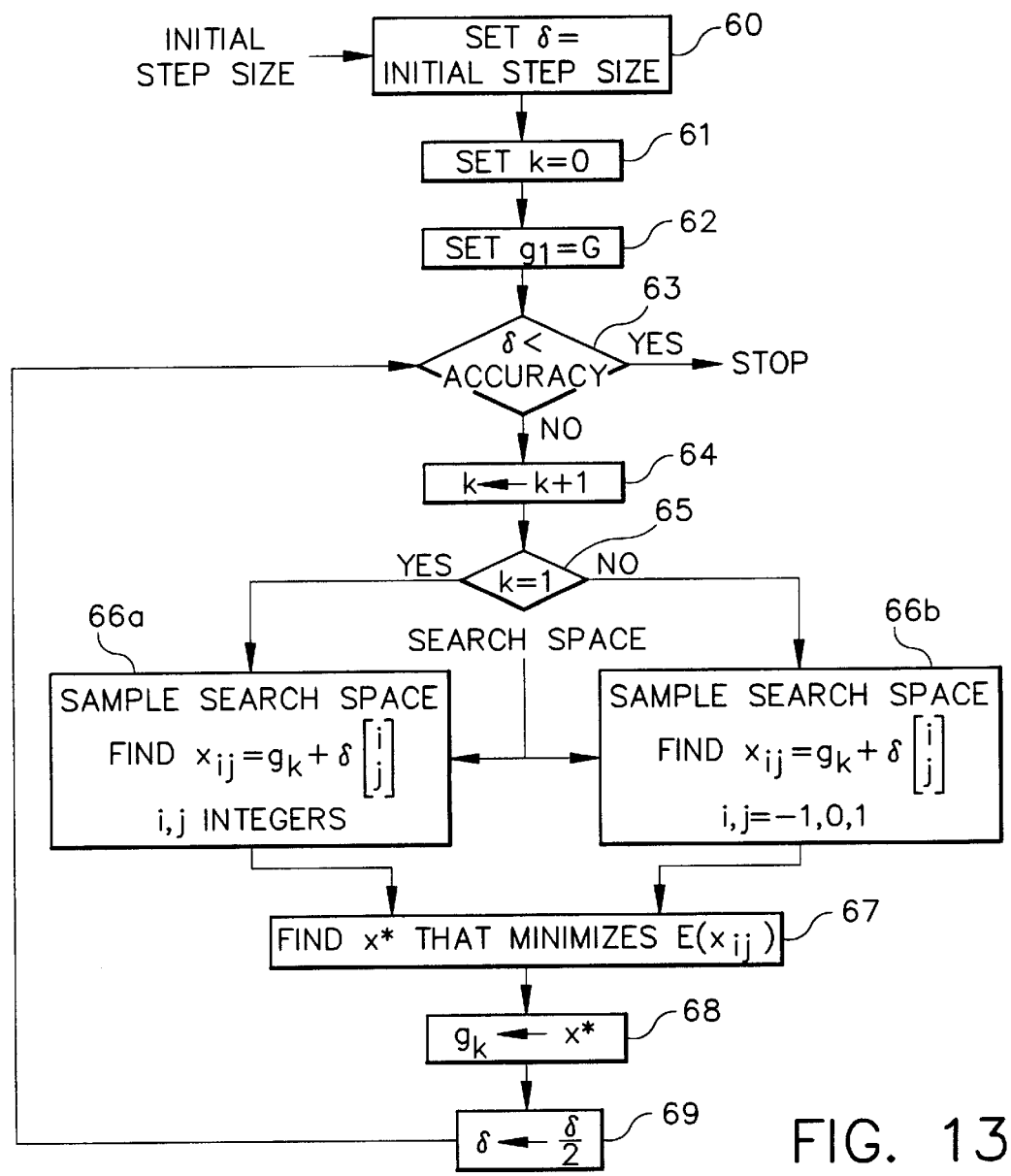
FIG. 13 is a flowchart illustrating a logarithmic search method for refining the location of an inside node.

The optimum location for G 51 is found using a logarithmic method which reduces the computational load, especially when subpixel accuracy is applied. The block diagram for logarithmic search is shown in FIG. 13.

Let d denote step size at each step of logarithmic search. In the first step 60 of logarithmic search, d is set to an initial step size, specified by the user as a power of two, and the level number k is set to 0, step 61. Let $g_k$ denote the image coordinates of node G 51 at level k of the logarithmic search, where $g_1$ is set to the location of G 51, step 62, $$k_{max} = 1 + \log_2\left(\frac{\text{initial step size}}{\text{accuracy}}\right),$$

and the value of accuracy is specified by the user. Increment k by 1, step 64, and if k=1, step 65, obtain the following locations by sampling the search space, A, with d, step 66a:

$$x_{ij} = g_k + \delta \begin{bmatrix} i \\ j \end{bmatrix},$$

where i,j are integers and $x_{ij} \in A$, (20)

Figure 14A:
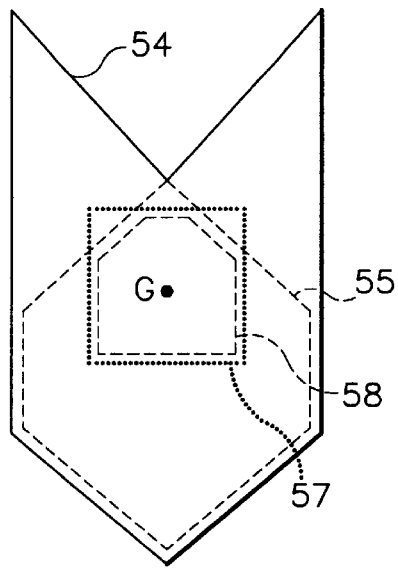
FIG. 14A–14C is a diagram further illustrating the method of FIG. 13.
Figure 14B:
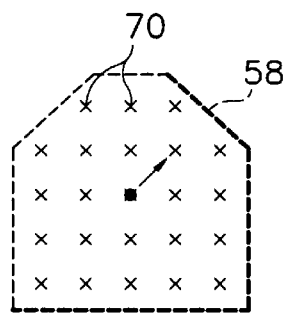
Figure 14C:
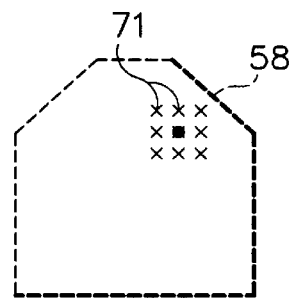

G 51 is moved to each sample location 70 given above and shown in FIG. 14, the image intensities inside the cost polygon are synthesized, and the prediction errors, $E(x_{ij})$'s, are computed. The sample location 70 giving the lowest prediction error is kept as the new location for G, i.e. let $g_{k+1}=x$, step 68, such that $E(x_{ij})$ is minimum for x*, step 67 Set $$\delta \leftarrow \frac{\delta}{2},$$

step 69, and k←k+1., step 64. In the subsequent levels of the logarithmic search, i.e., for k>1, the search space 58 is limited to a 3×3 neighborhood 71 of $g_k$ at each level. This 3×3 region is given by, step 66b, $$x_{ij} = g_k + \delta \begin{bmatrix} i \\ j \end{bmatrix},$$

where i,j=−1,0,1, provided $x_{ij} \in A$, (21)

We let $g_{k+1}=x^*$, step 68, such that $E(x_{ij})$ is minimum for x*, step 67, and set $$\delta \leftarrow \frac{\delta}{2},$$

step 69, and k←k+1, step 64 Logarithmic search is stopped once the desired accuracy is reached, i.e. when δ=accuracy, step 63. A simple realization of logarithmic search is shown in FIG. 14. In the exhaustive search strategy introduced in Nakaya, et al., initial sampling rate, δ is set to accuracy and only the first stage of our logarithmic search method, i.e., k=1, is applied. Assuming an N×N search window 57 and a desired accuracy value of a, there are up to $$\left(\frac{1}{a^2}N^2\right)$$

candidates 70 for G 51 in an exhaustive search, compared to $$\left(\left(1+2\left\lfloor\frac{N}{2s}\right\rfloor\right)^2+8\log_2\frac{s}{a}\right),$$

where $\lfloor x \rfloor$ denotes the largest integer not greater than x, and s denotes the initial sampling rate, in the presently disclosed logarithmic search method. Thus, for example, for N=9, s=2, a=⅛, the presently disclosed logarithmic search approach is nearly 83 times faster than Nakaya, et al.

Figure 15:
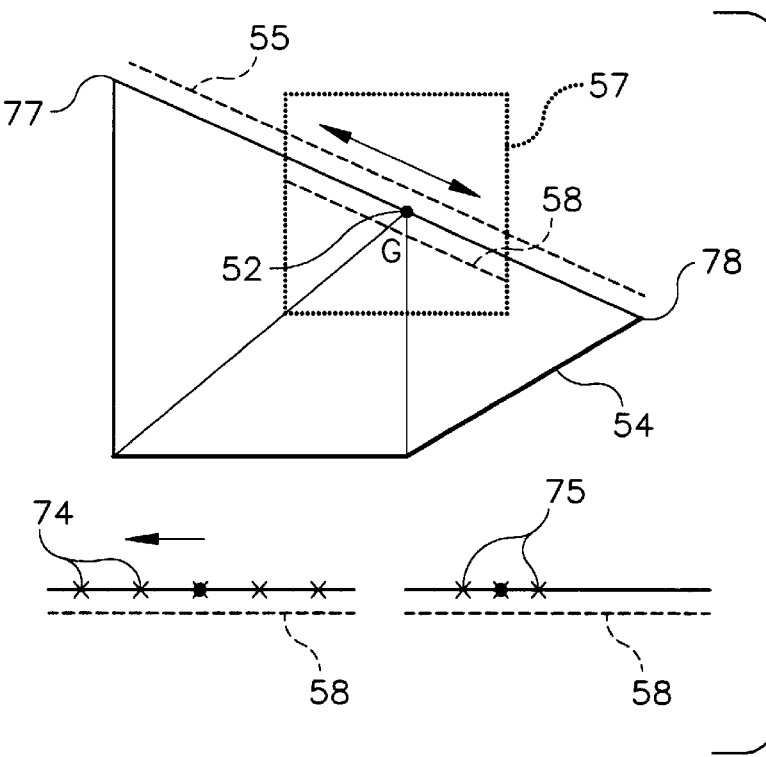
FIG. 15 is a diagram illustrating a logarithmic search method for refining the location of a boundary node.

For a boundary node 52, the search space 58 is limited on a line as shown in FIG. 15. The cost polygon 54 for a boundary node 52 is formed in the same way as for an inside node 51, i.e., the cost polygon 54 for a boundary node 52 is the outline of the union of the patches 122 that have the boundary node 52 as one of their corners. The search polygon for a boundary node 52 is defined to be the line segment whose end points are the nodes 77, 78 that are neighbors to the boundary node 52 (G) on each side. The movement of G 52 is also limited by a rectangular search window 57 centered around G 52, whose size is specified by the user. The intersection of the search polygon 55 and the search window 57 result in the search space 58, which is denoted as B. A similar logarithmic method is then applied to boundary node G 52 in terms of a distance measure as explained below.

Let d denote step size at each step of logarithmic search. In the first step 80 of logarithmic search d is set to an initial step size, specified by the user as a power of two, and the level number k is set to 0, step 81. Let $g_k$ denote the image coordinates of grid G at level k of the logarithmic search, where $g_1$=G, step 82, and $$k_{\max} = 1 + \log_2\left(\frac{\text{initial step size}}{\text{accuracy}}\right),$$

and the value of accuracy is specified by the user. Increment k by 1, step 84, and if k=1, step 85, obtain the following locations 74 by sampling the search space B 58 with d, step 86a:

$x_i = g_k + i\delta u$, i is an integer such that $x_i \in B$. (22)

Let $g_{k+1}=x^*$, step 88, such that $E(x_{ij})$ is minimum for $x^*$, step 87 Set $$\delta \leftarrow \frac{\delta}{2},$$

step 89, and k←k+1., step 84 In the subsequent levels of the logarithmic search, i.e., for k>1, the search space is limited to 3 locations 75 in the neighborhood of $g_k$ These locations 75 are calculated as, step 86b, $x_i = g_k + i\delta u$, i=−1,0,1 provided $x_i \in B$. (23)

Figure 16:
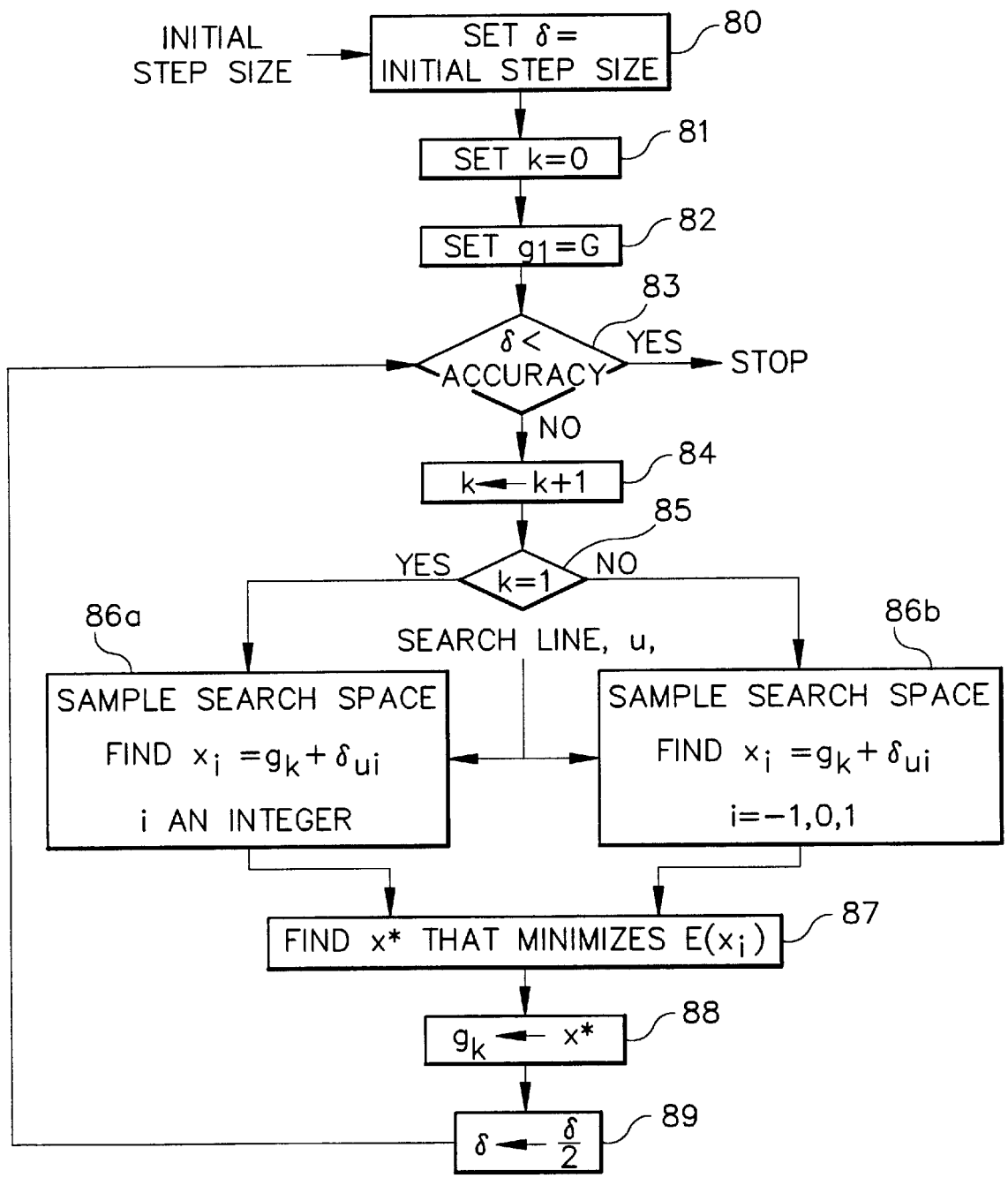
FIG. 16 is a flowchart illustrating the method of FIG. 15.

The logarithmic search is stopped once the desired accuracy is reached. The flow diagram of the logarithmic search method is shown in FIG. 16.

The hexagonal search process is iteratively applied to the nodes 123 of the mesh 121 as explained in Nakaya, et al. Due to the nature of the hexagonal search mechanism, the number of nodes 123 whose positions are refined during one iteration will decrease with the increasing number of iterations. During an iteration, the nodes of the mesh 121 can be visited in a fixed or random order. Iterations are stopped when there is no node whose position needs to be refined or when a maximum number of iterations has been reached. Due to repeated warpings of patches 122, this iterative method is computationally expensive, however, it is possible to process up to one third of the nodes in parallel as suggested in Nakaya, et al.

The present invention also refines the location of each corner node 53. The refinement is performed at each iteration of the hexagonal search. The corner nodes are refined after or before all boundary 52 and inside nodes 51 are refined at each iteration. This step is introduced to refine the corner locations obtained as a result of corner tracking.

Let $c_i$ denote the $i$th corner of the current polygon 112 which is also a corner node 53 of the current mesh 121. The problem in moving a corner node 53 during the refinement process is in defining a cost polygon 54 for a corner node 53. The cost polygon 54 has to be inside the current polygon 112, close to the corner node 53, and interact with the mesh structure. This invention introduces two methods which are called as "local method" and "global method". Both methods are based on constructing a point and a patch list as explained below. In local method, the point list is initialized with the corner node 53 ($c_i$) and the nodes in the current mesh 121 that are connected to $c_i$. Then, the nodes in the current mesh 121 that are connected to at least two of the nodes in the initial list are also added to the point list (this is because a quadrilateral can be diagonally divided into two triangles in two different ways, and the nodes that are connected to a corner node can be different for each case).

Figure 17:
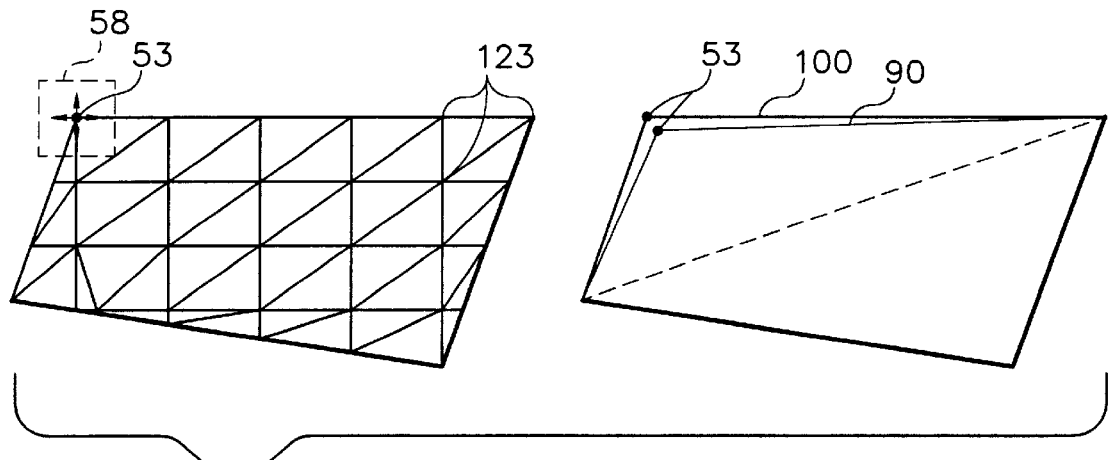
FIG. 17 is a diagram illustrating a logarithmic search method for refining the location of a corner node.

In global method, the point list is constructed in a different way. Referring to FIG. 17, in this case, a triangle 90, denoted as H, is formed by joining the previous, current and next corners of the current polygon in clockwise order, i.e. $H=c_{i-1}\hat{c}_i c_{i+1}$, we call this triangle as "reference corner triangle". All the nodes of the mesh 121 that lie on or inside this triangle 90 form the point list. Once the point list is constructed using either one of the methods discussed above, a list of patches in the mesh 121 that will be affected from the movements of all nodes in the point list is constructed. The patch list is formed by the patches in the mesh 121 that have as a corner at least one of the nodes in the point list.

A logarithmic search strategy similar to ones discussed during hexagonal search method has been applied for finding the best location for the corner node 53. Search space 58 of the corner node 53 is defined by a square window around $c_i$, and denoted as D. The definition of the search space 58 remains the same for each iteration of hexagonal search.

Figure 18:
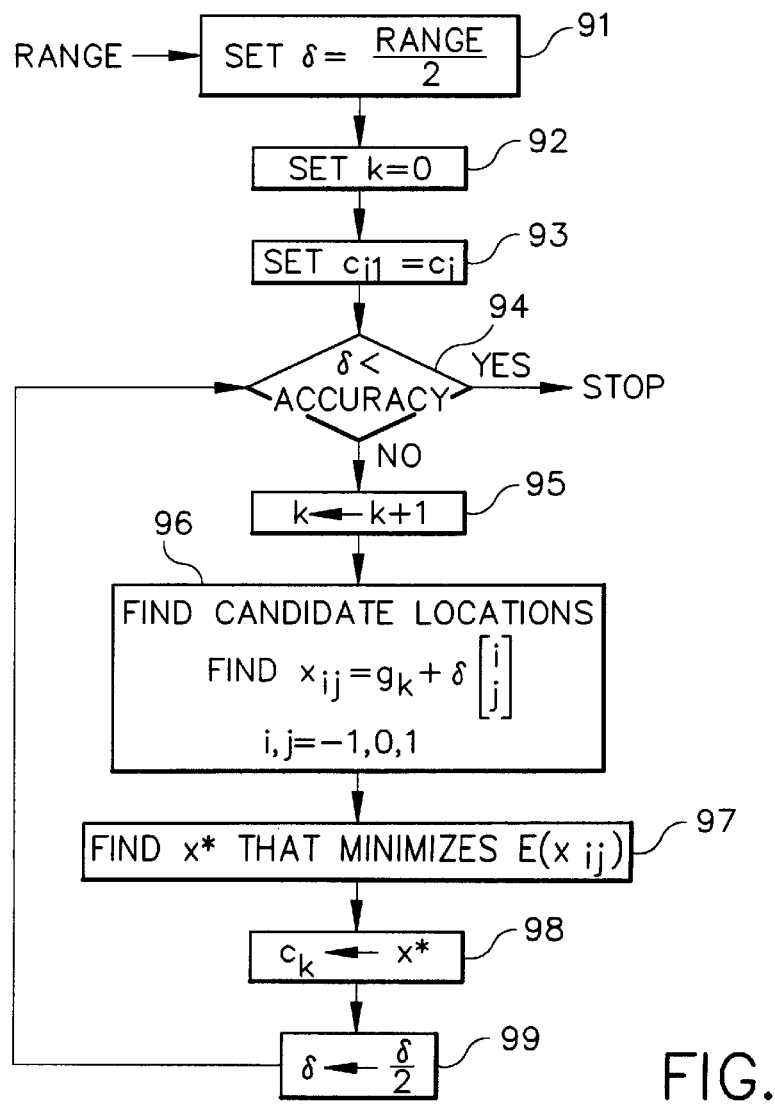
FIG. 18 is a diagram further illustrating the method of FIG. 17.

Referring to FIG. 18, at the first step of logarithmic search for the corner refinement, step size, δ is set to the half of the range, step 91, and the level number k is set to 0. Let $S_k$ denote the $k$th patch in the patch list, where k=1,2, . . . , K and K denotes the total number of patches in the patch list. Also let $c_{i_k}$ denote the coordinate of the corner $c_i$ at $k$th step of logarithmic search, where $c_{i_1}=c_i$, step 93 and $$k = 1, 2, \ldots, k_{\max} = \log_2\frac{\text{range}}{\text{accuracy}}.$$

Increment k by 1, step 95, and obtain the following 9 locations by sampling the search space, with d, step 96:

$$x_{ij} = c_{i_k} + \delta \begin{bmatrix} i \\ j \end{bmatrix}, \quad i, j = -1, 0, 1, \text{ provided } x_{ij} \in D, \qquad (24)$$

When the corner, $c_i$ moves to a new location, x, another triangle 100 which we call as "moved half triangle", and denoted by H', where H'=$c_{i-1}$x̂x$c_{i+1}$ is formed. Patches in the patch list are mapped using the affine transformation, $A_x$, between H and H'. After affine mapping is applied to patches deformed patches denoted as S'$_k$ are obtained for k=1,2, ..., K. Using the mappings between undeformed patches on the reference meshes, $S_{rk}$, and deformed patch S'$_k$, intensity distribution on all patches is predicted. Using (18), E(x) is calculated, which is as an error criterion for corner movement. The location x* where E($x_{ij}$) is minimum, step 97, for i,j=−1,0,1, is kept as $C_{i_k}$, step 97. The step size is halved, step 99, and the logarithmic search is continued until the step size is less than the accuracy, step 94. After $^k$max has been reached logarithmic search is stopped. Reference half triangle and effect of corner movement can be seen in FIG. 17.

Current corner's movement can also be performed exhaustively. Then all locations calculated as $$x_{ij} = c_{i_k} + \delta \begin{bmatrix} i \\ j \end{bmatrix}, \quad i, j = -range, 0, range, \text{ provided } x_{ij} \in D. \qquad (25)$$

are tested for smallest matching error (18). The location that minimizes the prediction error E(x) is chosen as the new location for $c_i$ among, $x_{ij}$'s.

In logarithmic method initial step for corner movement is set to half of the range and at each iteration this step size is reduced to its half. The flow diagram for logarithmic search for a corner is shown in FIG. 18.

A corner node 53 is visited, i.e., tested for possible refinement in its position, if the current iteration is the first one or a neighboring node in the mesh 121 has moved before the corner node 53 is visited. Corners are visited by two different strategy, called as "bottom-up" and "top-down" approaches. In the bottom-up approach, corners nodes 53 are visited after all the boundary 52 and inside 51 nodes are visited in every iteration. In the top-down approach, corners nodes 53 are visited before the boundary 52 and inside 51 nodes are visited in every iteration.

Figure 19:
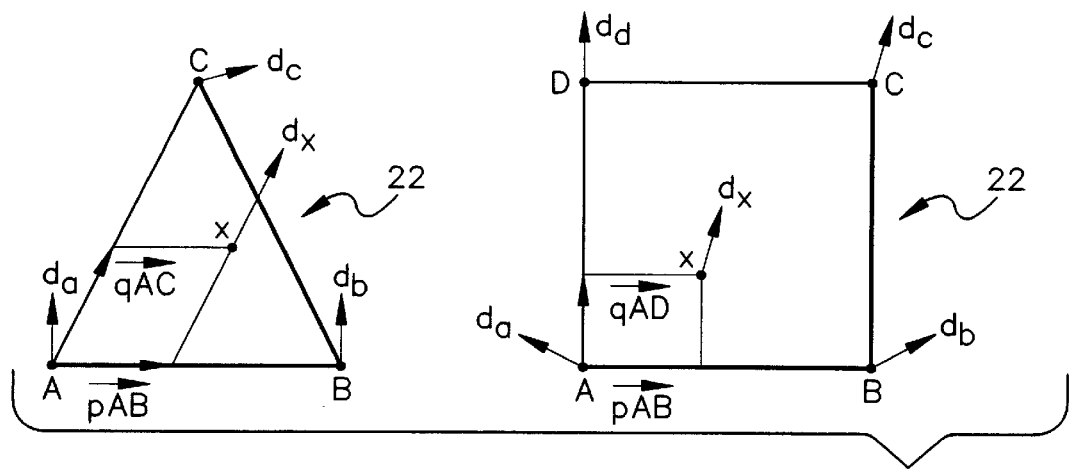
FIG. 19 is a diagram illustrating a method of incorporating illumination changes during motion tracking.
Figure 20A:
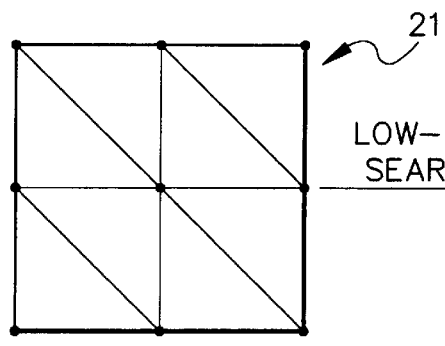
FIG. 20A–20E is a diagram illustrating hierarchical hexagonal search method.
Figure 20B:
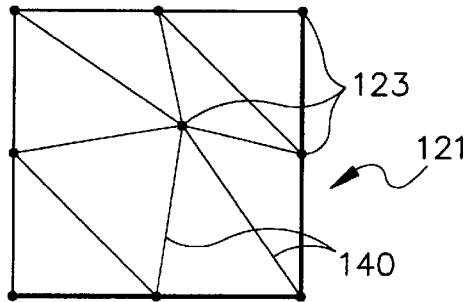
Figure 20C:
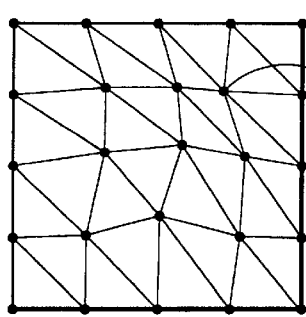
Figure 20D:
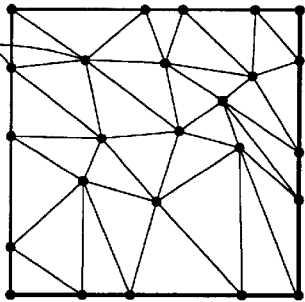
Figure 20E:
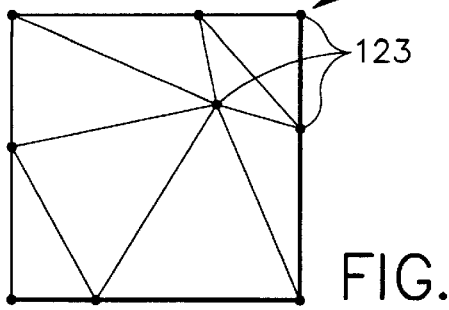

When a corner node 53 is moved to a new location during logarithmic search, the boundary of the current polygon 112 is changed and all the nodes of the mesh 121 that are inside the reference half triangle 90 are mapped with the affine mapping between the reference half triangle 90 and the new half triangle 100 formed when the corner node 53 has moved Incorporating Illumination Chanaes In the present invention, displacement vector $d_x$ for a pixel location x in a patch 22 is calculated bilinearly from the displacement vectors of the corners of the patch 22. Referring to FIG. 19, given a triangular patch ABC 22 and a pixel x inside the patch 22, the pixel location can be written as $$x=a+pAB+qAC, \qquad (26)$$

where a gives the position of point A.

If $d_a,d_b,d_c$ denote the displacements of corners A,B,C, respectively, displacement of pixel x, $d_x$, is calculated using, $$d_x=(1-p-q)d_a+pd_b+qd_c. \qquad (27)$$

If the patch 22 is rectangular, given the displacements of each corner, displacement of a pixel x inside the rectangle ABCD is calculated using $$d_x=(1-p)(1-q)d_a+p(1-q)d_b+pqd_c+(p-1)qd_d \qquad (28)$$

where $$x=a+pAB+qAD. \qquad (29)$$

A pictorial representation of interpolation for triangular and rectangular patches 22 is shown in FIG. 19.

In C.-S. Fuh and P. Maragos, "Affine models for image matching and motion detection," in *IEEE International Conference Acoustic Speech and Signal Processing*, pp. 2409–2412, May 1991, Toronto, Canada a method is disclosed to model the effects of illumination change on the image intensity distribution. The method disclosed in C.-S. Fuh and P. Maragos employ the following error criterion:

$$MSE(d_x, r, c) = \frac{1}{N} \sum_{x \in S} (I_c(x) - rI_r(x + d_x) - c)^2 \qquad (30)$$

where r is referred to as the multiplicative illumination coefficient and c is referred to as the additive illumination coefficient.

In order to minimize Equation 30, C.-S. Fuh and P. Maragos first find optimal r and c by setting the partial derivatives ∂MSE/∂r and ∂MSE/∂c to 0. This yields two linear equations in r and c which can be solved to find optimal r* and c* as a function of $d_x$. Letting $I_c(x)=I$ and $I_r(x+d_x)=\tilde{I}$, optimal solutions are given as follows:

$$r^* = \frac{\sum I\tilde{I} - \sum I \sum \tilde{I}}{N\sum \tilde{I}^2 - (\sum \tilde{I})^2} \qquad (31)$$

$$c^* = \frac{\sum \tilde{I}^2 \sum I - \sum I\tilde{I} \sum \tilde{I}}{N\sum \tilde{I}^2 - (\sum \tilde{I})^2}$$

where all the summations are over x in patch 22.

In C.-S. Fuh and P. Maragos, the values of the illumination coefficients r and c are assumed constant for all x in patch 22. However, in most image sequences, illumination also changes spatially within a frame. The present invention discloses a new method to overcome this problem. Rather then assigning a pair (r,c) of illumination coefficients to each patch 22 on the mesh 21, the presently disclosed method assigns a pair (r,c) of illumination coefficients to each node 23 on the mesh 21. The presently disclosed invention allows illumination to continuously vary within a patch 22 by obtaining the illumination at location x from the illumination coefficients assigned to the corners of the patch 22 using bilinear interpolation which is given below for a triangular mesh 22

$$r_x=(1-p-q)r_a+pr_b+qr_c$$

$$c_x=(1-p-q)c_a+pc_b+qc_c, \qquad (32)$$

where, $(r_a, c_a)$, $(r_b, c_b)$, and $(r_c, c_c)$ are the illumination coefficients respectively assigned to corners A, B, and C, and $(r_x, c_x)$ corresponds to the illumination at point x in patch 22.

In order to estimate the illumination coefficients (r, c) for each node, the present invention discloses two different methods. In the first method, r and c are assumed to be constant inside the cost polygon 54 of an inside or boundary node, and values for r and c found as a result of hexagonal search are assigned to the node. For a corner node 53, the presently disclosed invention assigns a weighted average of r and c values calculated on the patches which have the corner node as one of their corners. The weights are determined by the area of each patch.

In the second method which is called as "interpolation method", r and c values are allowed to continuously vary for each pixel location inside the cost polygon 54 during hexagonal search. This method is used only for inside and boundary nodes. The bilinear interpolation method that has been mentioned above is applied for calculating these values. Let G denote a node and let K denote the number of patches that are in the cost polygon associated with G. Let $S_k$, k=1,2, . . . , K denote the patches that are in the cost polygon associated with node G. Let $G_k$, k=1, . . . K, in clockwise (or counter-clockwise) order represent the nodes of the mesh that are on the cost polygon associated with node G. Then, the error criterion used in the second method is given by:

$$MSE(d_x, r_G, c_G) = \frac{1}{\sum_{k=1}^{K} N_k} \sum_{S_k} (I_c(x) - r_x I_r(x + d_x) - c_x)^2 \quad (33)$$

where $$r_x = ((1-p_x-q_x)r_G + p_x r_{G_k} + q_x r_{G_{k+1}})$$

and $$c_x = ((1-p_x-q_x)c_G + p_x c_{G_k} + q_x c_{G_{k+1}}).$$

where $(r_{G_k}, c_{G_k})$ are the illumination coefficients for node $G_k$. in the above expression $(r_{G_k}, c_{G_k})$ are fixed and assumed to be known. During the first iteration of the search, it is possible that some $G_k$'s are not visited prior to G. To overcome this problem, the present invention assigns initial values to illumination coefficients on every node in the mesh. The initial values for the multiplicative and additive illumination coefficients are either respectively set equal to 1.0 and 0.0, to their previous values calculated on the previous image.

Hierarchical Hexagonal Search

The present invention also discloses a method, henceforth called "hierarchical hexagonal search method," to implement the method of (E) in a hierarchy of spatial resolutions. Referring to the example given in FIG. 20, once the reference mesh 21 is tracked into the current frame 114 and the current mesh 121 is obtained, new inside and boundary nodes, henceforth called high resolution nodes 141, are added to the mesh 121 half way on each link 140 that connect two nodes 123 in the mesh 121. Once the high-resolution nodes are added to the mesh 121, step 50 of the present invention is repeated to further refine the locations of the low-resolution 123 and the locations of the high-resolution 141 nodes. Once step 50 is completed with high-resolution nodes in the mesh 121, still higher resolution nodes can be added to the mesh 121 and step 50 then repeated any number of times. At this point, it is important to note that, only the original low-resolution nodes 123 are mapped to a subsequent frame in step 40 to find the initial low-resolution mesh in the subsequent frame The advantages of the hierarchical hexagonal search methods are: (1) It is less sensitive to the initial patch size selected by the user as the size of the patches are varied during the hierarchical search process (2) it is computationally faster as large local motion can be tracked in less time with larger patches than with smaller patches, and smaller patches can track local motion in less time when their initial location is determined by the movement of large patches.

Synthetic Transfiguration

One important application of the invention is in the area of synthetic object transfiguration where an object, such as the contents of a billboard, is replaced by a new object and rendered throughout the sequence in the same manner as the original object. The application of the method to synthetic transfiguration is described below.

Referring to FIG. 3(a), once the 2-D meshes $M_1, \ldots, M_T$, are found which represent the global and local motion of the reference object 11 to be replaced, first, the reference mesh $M_r$ 21 is mapped onto $P_R$ 19 using a spatial transformation between $P_R$ and the reference polygon $P_r$, where the polygon $P_R$ 19 defines the boundary of the replacement object 17. For the transfiguration application, it is required that the spatial transformation between $P_R$ and $P_r$ can be represented by an affine transformation. Using the transformation between $P_R$ 19 and $P_r$ 12, the reference mesh $M_r$ 21 is mapped onto $f_R$ 18 to obtain the mesh $M_R$ 16 on the replacement object 17. Then, the following backward mappings are computed $$H_{n,m}: M_{n,m} \rightarrow M_{R,m}, \, m=1,2, \ldots, N, \, n=1,2, \ldots, T \quad (34)$$

where $H_{n,m}$ is the backward mapping between the $^m$th patch on the $^n$th mesh, $M_n$, and the $^m$th patch on the replacement mesh, $M_R$, N denotes the total number of patches in each mesh, and $T$ denotes the number of frames in the given image sequence.

If illumination changes are observed during the process of mesh tracking, they are also incorporated on the transfigured object 17 using $$I_n(x) = r_x I_R(H_{n,m}x) + c_x \text{ for all } x \in M_{n,m}, \quad (35)$$

where $I_n$ and $I_R$ respectively denote the image intensity distribution at the n-th and replacement frame. The multiplicative illumination coefficient $r_x$ and the additive illumination coefficient $c_x$ are obtained by bilinearly interpolating the multiplicative and additive illumination coefficients found for the corners of the patch $M_{n,m}$ during the process of mesh tracking. The details of the bilinear interpolation used for computing $r_x$ and $c_x$ are disclosed above.

We claim:

1. A method for tracking a first predetermined, two-dimensional portion of an image throughout a sequence of images, the method comprising the steps of:
   (a) selecting a reference frame;
   (b) selecting the predetermined, two-dimensional portion within the reference frame by choosing a reference polygon having at least three corners that defines the boundary of the first predetermined region;
   (c) fitting a reference mesh having corner nodes at the corners of the reference polygon and at least one inside node inside the reference polygon;
   (d) predicting the reference polygon in subsequent or previous image frames by independently tracking the corners of the reference polygon;
   (e1) dividing the reference polygon and the tracked polygon into a minimum number of triangles so that each triangle in the reference polygon respectively corresponds to a triangle in the tracked polygon;
   (e2) finding parameters of affine transformation between each corresponding pair of triangles; and
   (e3) mapping nodes in each triangle of the reference polygon into the respective triangle in the tracked polygon using the parameters of the corresponding affine transformation used for the triangle in which the node is located;

(f) refining locations of the inside and corner nodes of the corresponding mesh for tracking local and global motion of the first predetermined portion, wherein the steps (c) to (f) are implemented in a hierarchy of spatial resolutions;

(g) refining the location of boundary nodes on the reference mesh for tracking the local motion around the boundary of the first predetermined portion;

(h) tracking illumination changes that occurred between the reference frame and a previous or subsequent frame; and (i) replacing the first predetermined portion with a second predetermined portion throughout a portion of the sequence of images so that the second predetermined portion undergoes the same global and local motion as the first predetermined portion; wherein the corner, inside and boundary nodes divide the reference mesh into either triangular or rectangular patches or a combination of both triangular and rectangular patches; wherein step (d) includes: (d1) selecting a motion model for the corner nodes; (d2) assigning a cost polygon to each corner node; and (d3) estimating parameters of the motion model for each cost polygon and (d4) mapping the corner nodes with the estimated motion parameters.

2. The method as in claim 1, wherein step (d3) further includes defining a maximum range for estimating the parameters of the motion model.

3. The method as in claim 2, further comprising the step of refining the location of boundary nodes on the tracked polygon.

4. The method as in claim 3 further comprising the step of fitting a mesh to the second predetermined portion that corresponds in nodes and patches to the mesh in the reference polygon.

5. The method as in claim 4 further comprising the steps of finding parameters of affine transformation between each corresponding pair of patches in the second predetermined portion and the tracked polygon in the previous and subsequent image frames.

6. The method as in claim 5 further comprising the step of mapping pixels in each patch in the second predetermined portion into the corresponding patch in the tracked polygon using the parameters of the corresponding affine transformation.

7. An article of manufacture comprising:

a computer usable medium having computer readable program means embodied therein for causing tracking of a first predetermined, two-dimensional portion of an image throughout a sequence of images, the computer readable program code means in said article of manufacture comprising:

(a) computer readable program means for causing the computer to effect selecting a reference frame;

(b) computer readable program means for causing the computer to effect selecting the first predetermined, two-dimensional portion within the reference frame by choosing a reference polygon having at least three corners that defines the boundary of the first predetermined portion;

(c) computer readable program means for causing the computer to effect fitting a reference mesh having corner nodes at the corners of the reference polygon and at least one inside the reference polygon;

(d) computer readable program means for causing the computer to effect predicting the reference polygon in subsequent or previous image frames by independently tracking the corner of the reference polygon;

(e) computer readable program means for dividing the reference polygon and the tracked polygon into a minimum number of triangles so that each triangle in the reference polygon respectively corresponds to a triangle in the tracked polygon; for finding parameters of affine transformation between each corresponding pair of triangles; and for mapping nodes in each triangle of the reference polygon into the respective triangle in the tracked polygon using the parameters of the corresponding affine transformation used for the triangle in which the node is located;

(f) computer readable program means for causing the computer to effect refining locations of the inside and corner nodes of the corresponding mesh for tracking local and global motion of the first predetermined portion;

(g) means for causing the computer to effect defining the location of boundary nodes on the reference mesh for tracking the local motion around the boundary of the predetermined portion;

(h) means for causing the computer to effect tracking illumination changes that occurred between the reference frame and a previous or subsequent frame;

(i) means for causing said (c), (d), (e) and (f) computer readable program means to be implemented in a hierarchy of spatial resolutions;

(j) means for causing the computer to effect replacing the first predetermined portion with a second predetermined portion throughout a portion of the sequence of images so that the second predetermined portion undergoes the same global and local motion as the first predetermined portion, wherein the corner, inside and boundary nodes divide the reference mesh into either triangular or rectangular patches or a combination of both triangular and rectangular patches; and (k) means for selecting a motion model for the corner nodes; for assigning a cost polygon to each corner node; for estimating parameters of the motion model for each cost polygon; and for mapping the corner nodes with the estimated motion parameters.

8. The article of manufacture as in claim 7 further comprising computer readable program means for defining a maximum range for estimating the parameters of the motion model.

9. The article of manufacture as in claim 8 further comprising computer readable program means for refining the location of boundary nodes on the tracked polygon.

10. The article of manufacture as in claim 9 further comprising computer readable program means for fitting a mesh to the second predetermined portion that corresponds in nodes and patches to the mesh in the reference polygon.

11. The article of manufacture as in claim 10 further comprising computer readable program means for finding parameters of affine transformation between each corresponding pair of patches in the second predetermined portion and the tracked polygon in the previous and subsequent image frames.

12. The article of manufacture as in claim 11 further comprising computer readable program means for mapping pixels in each patch in the second predetermined portion into the corresponding patch in the tracked polygon using the parameters of the corresponding affine transformation.

13. A method for tracking a first predetermined, two-dimensional portion of an image throughout a sequence of images, the method comprising the steps of:

(a) selecting a reference frame;

(b) selecting the predetermined, two-dimensional portion within the reference frame by choosing a reference polygon having at least three corners that defines the boundary of the first predetermined region;

(c) fitting a reference mesh having corner nodes at the corners of the reference polygon and at least one inside node inside the reference polygon;

(d) predicting the reference polygon in subsequent or previous image frames by independently tracking the corners of the reference polygon;

(e) predicting a corresponding mesh in the subsequent or previous image frames by mapping the reference mesh into the tracked polygon using a plurality of different affine transformations;

(f) refining locations of the inside and corner nodes of the corresponding mesh for tracking local and global motion of the first predetermined portion; wherein the steps (c) to (f) are implemented in a hierarchy of spatial resolutions;

(g) refining the location of boundary nodes on the reference mesh for tracking the local motion around the boundary of the first predetermined portion;

(h) tracking illumination changes that occurred between the reference frame and a previous or subsequent frame;

(i) replacing the first predetermined portion with a second predetermined portion throughout a portion of the sequence of images so that the second predetermined portion undergoes the same global and local motion as the first predetermined portion; wherein the corner, inside and boundary nodes divide the reference mesh into either triangular or rectangular patches or a combination of both triangular and rectangular patches; and wherein step (d) includes: (d1) selecting a motion model for the corner nodes; (d2) assigning a cost polygon to each corner node; and (d3) estimating parameters of the motion model for each cost polygon and (d4) mapping the corner nodes with the estimated motion parameters.

* * * * *